(12) United States Patent
Lim

(10) Patent No.: US 11,105,989 B2
(45) Date of Patent: Aug. 31, 2021

(54) OPTICAL ASSEMBLY AND METHOD OF FORMING THE SAME

(71) Applicant: Agency for Science, Technology and Research, Singapore (SG)

(72) Inventor: Teck Guan Lim, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 81 days.

(21) Appl. No.: 16/498,891

(22) PCT Filed: Mar. 28, 2018

(86) PCT No.: PCT/SG2018/050144
§ 371 (c)(1),
(2) Date: Sep. 27, 2019

(87) PCT Pub. No.: WO2018/182516
PCT Pub. Date: Oct. 4, 2018

(65) Prior Publication Data
US 2021/0109302 A1 Apr. 15, 2021

(30) Foreign Application Priority Data
Mar. 29, 2017 (SG) .............................. 10201702567P

(51) Int. Cl.
*G02B 6/42* (2006.01)
(52) U.S. Cl.
CPC ......... *G02B 6/4231* (2013.01); *G02B 6/4206* (2013.01); *G02B 6/4243* (2013.01)
(58) Field of Classification Search
CPC ...... G02B 6/42; G02B 6/4231; G02B 6/4206; G02B 6/4243; G02B 6/00

USPC .......................................................... 385/37
See application file for complete search history.

(56) References Cited

U.S. PATENT DOCUMENTS

| | | | |
|---|---|---|---|
| 5,257,336 A | 10/1993 | Dautartas | |
| 5,297,228 A * | 3/1994 | Yanagawa | G02B 6/30 359/900 |
| 5,371,820 A * | 12/1994 | Welbourn | G02B 6/3839 385/130 |

(Continued)

FOREIGN PATENT DOCUMENTS

| CN | 201508424 U | 6/2010 |
|---|---|---|
| JP | H06-167634 A | 6/1994 |

OTHER PUBLICATIONS

Hauffe et al., "Methods for Passive Fiber Chip Coupling of Integrated Optical Devices," IEEE Transactions on Advanced Packaging, vol. 24, No. 4, 2001, pp. 450-455.

(Continued)

*Primary Examiner* — Kaveh C Kianni
(74) *Attorney, Agent, or Firm* — Winstead PC

(57) ABSTRACT

Various embodiments may provide an optical assembly. The optical assembly may include a substrate with a first and a second grooves, and a photonic integrated circuit chip with a coupling waveguide, a first and a second grooves. The optical assembly may further include a first and a second cylindrical rods held by the respective grooves of the substrate and the photonic integrated circuit chip. A portion of the first rod and a portion of the second rod define a vertical offset between the photonic integrated circuit chip and the substrate to align the coupling waveguide with an optical fiber.

16 Claims, 30 Drawing Sheets

(56) References Cited

U.S. PATENT DOCUMENTS

| | | | |
|---|---|---|---|
| 5,432,878 A | 7/1995 | Smous | |
| 5,613,024 A * | 3/1997 | Shahid | G02B 6/30 385/52 |
| 6,243,518 B1 * | 6/2001 | Lee | G02B 6/3839 385/54 |
| 6,298,192 B1 * | 10/2001 | Yoo | G02B 6/30 385/137 |
| 6,324,323 B1 * | 11/2001 | Benham | G02B 6/3652 385/14 |
| 6,665,487 B2 * | 12/2003 | Wang | G02B 6/4231 385/134 |
| 7,303,339 B2 * | 12/2007 | Zhou | G02B 6/136 385/91 |
| 9,134,490 B2 * | 9/2015 | Feng | G02B 6/423 |
| 9,529,155 B2 * | 12/2016 | Bhagavatula | G02B 6/3885 |
| 2002/0197015 A1 * | 12/2002 | Shaw | G02B 6/4231 385/49 |
| 2003/0012544 A1 * | 1/2003 | Matsumoto | G02B 6/3676 385/137 |
| 2012/0025209 A1 * | 2/2012 | Kim | G02B 6/4292 257/81 |
| 2012/0189245 A1 * | 7/2012 | Bowen | G02B 6/122 385/14 |
| 2019/0384007 A1 * | 12/2019 | Matiss | G02B 6/262 |

OTHER PUBLICATIONS

Yang et al., "Interposer-to-Interposer Electrical and Silicon Photonic Interconnection Platform Using Silicon Bridge," 2014 IEEE Optical Interconnects Conference, 2014, pp. 71-72.

Kaou et al., "Microconnectors for the Passive Alignment of Optical Waveguides and Ribbon Optical Fibers," The Thirteenth Annual International Conference on Micro Electra Mechanical Systems, 2000, pp. 692-697.

Lorenz et al., "Development of a Wafer-Level Integration Technology for Photonic Transceivers Based on Planar Lightwave Circuits," 37th International Spring Seminar on Electronics Technology (ISSE), 2014, pp. 130-136.

Barwicz et al., "Automated, Self-Aligned Assembly of 12 Fibers per Nanophotonic Chip with Standard Microelectronics Assembly Tooling," IEEE 65th Electronic Components and Technology Conference (ECTC), 2015, pp. 775-782.

Jia et al., "Low Loss/Large Tolerance Mode Converter Between SiN Waveguide and Cleaved Single Mode Fiber," Optical Fiber Communications Conference and Exhibition (OFC), 2014, pp. 1-3.

Ku et al., "Wide-Band Optical Mode Converters for Coupling Between Fibers and Silicon Photonic Wires With Large Misalignment Tolerance," Journal of Lightwave Technology, vol. 31, No. 10, May 15, 2013, pp. 1616-1620.

Kopp et al., "Silicon Photonic Circuits: On-CMOS Integration, Fiber Optical Coupling, and Packaging," IEEE Journal of Selected Topics in Quantum Electronics, vol. 17, No. 3, May/Jun. 2011, pp. 498-509.

Murphy et al., "Self-Alignment Technique for Fiber Attachment to Guided Wave Eevices," IEEE Journal of Quantum Electronics, vol. 22, No. 6, Jun. 2986, pp. 928-932.

International Preliminary Report on Patentability for International Application No. PCT/SG2018/050144 dated Mar. 8, 2019, pp. 1-28.

International Search Report for International Application No. PCT/SG2018/050144 dated Jun. 12, 2018, pp. 1-4.

Written Opinion of the International Searching Authority for International Application No. PCT/SG2018/050144 dated Jun. 12, 2018, pp. 1-5.

* cited by examiner

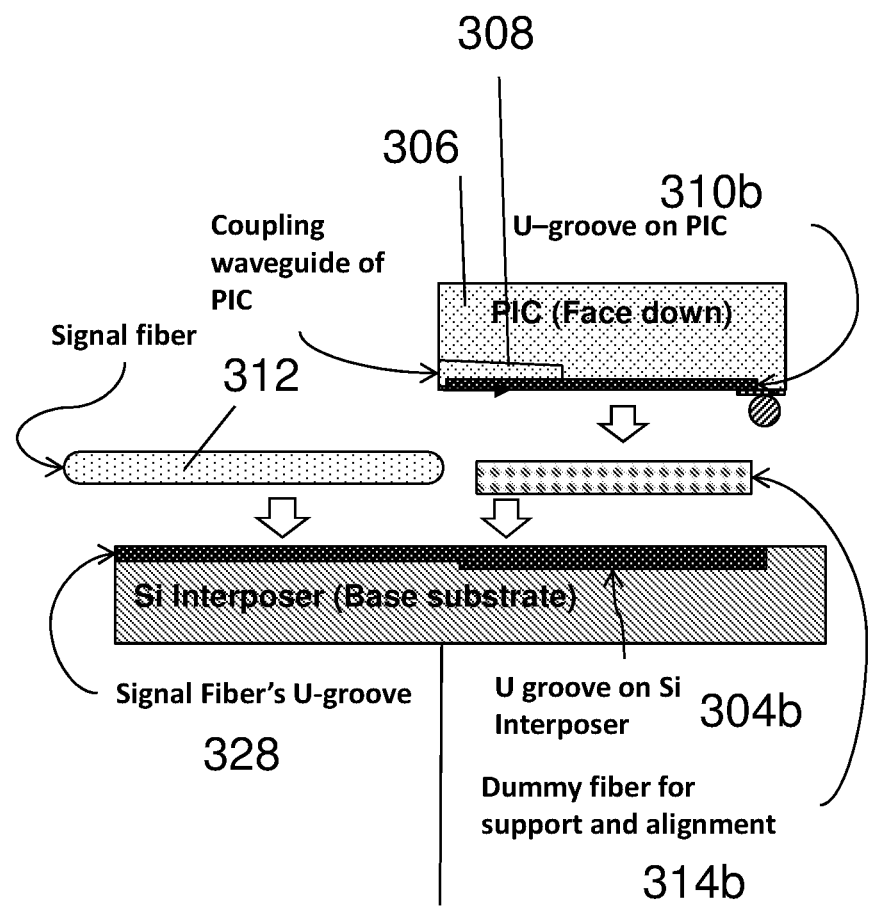

Pitch 125μm
TX line 600μm
Si Resistivity 700Ωcm 0   250   500 (μm)

0      300      600 (μm)

OPTICAL ASSEMBLY AND METHOD OF FORMING THE SAME

CROSS-REFERENCE TO RELATED APPLICATION

This application claims the benefit of priority of Singapore application No. 10201702567P filed on Mar. 29, 2017, the contents of it being hereby incorporated by reference in its entirety for all purposes.

TECHNICAL FIELD

Various aspects of this disclosure relate to an optical assembly. Various aspects of this disclosure relate to a method of forming an optical assembly.

BACKGROUND

Optical coupling and high speed electrical integration are the major challenges of the current optical transceiver. Due to compatibility with complementary metal oxide semiconductor (CMOS) processes and the rapid performance improvements in the last decade, the preferred technology for high speed optical transceiver design is silicon photonics.

Transceiver designs may require coupling of light between the external fiber and the photonic integrated circuit (PIC) waveguide. For edge coupling, reverse nanotaper or mode converter is usually implemented to reduce the optical coupling, loss and at the same time to increase the assembly tolerance for manufacturing. The mode convertor designed by Institute of Microelectronics (IME) has a coupling loss of 1.2 dB/facet and 1.4 dB/facet for transverse electric (TE) and traverse magnetic (TM) mode, respectively, and has a 3 dB alignment tolerance of 3 µm.

However, aligning and assembling the optical fiber within ±3 µm to the PIC waveguide input for mass production is still a challenging and time-consuming process, as there are a total of 6 axes that are required to be aligned.

SUMMARY

Various embodiments may provide an optical assembly. The optical assembly may include a substrate. The substrate may include a first groove on a surface of the substrate, the first groove having a first lateral surface, a second lateral surface, and a base joining the first lateral surface and the second lateral surface. The substrate may also include a second groove on the surface of the substrate and parallel to the first groove of the substrate, the second groove having a first lateral surface, a second lateral surface, and a base joining the first lateral surface and the second lateral surface.

The optical assembly may further include a photonic integrated circuit chip (PIC) over or above the substrate with a surface of the photonic integrated circuit chip facing the surface of the substrate.

The photonic integrated circuit chip may include a coupling waveguide. The photonic integrated circuit chip may also include a first groove on the surface of the photonic integrated circuit chip, the first groove having a first lateral surface, a second lateral surface, and a base joining the first lateral surface and the second lateral surface. The photonic integrated circuit chip may additionally include a second groove on the surface of the photonic integrated circuit chip and parallel to the first groove of the photonic integrated circuit chip, the second groove having a first lateral surface, a second lateral surface, and a base joining the first lateral surface and the second lateral surface.

The optical assembly may also include an optical fiber over or above the substrate and lateral to the photonic integrated circuit chip. The optical assembly may further include a first cylindrical rod having a first portion received by the first groove of the substrate and spaced from the base of the first groove of the substrate, a second portion received by the first groove of the photonic integrated circuit chip and spaced from the base of the first groove of the photonic integrated circuit chip, and a third portion between the first portion and the second portion (of the first cylindrical rod). The optical assembly may additionally include a second cylindrical rod having a first portion received by the second groove of the substrate and spaced from the base of the second groove of the substrate, a second portion received by the second groove of the photonic integrated circuit chip, and a third portion between the first portion and the second portion (of the second cylindrical rod).

The third portion of the first cylindrical rod and the third portion of the second cylindrical rod may define a (desired) vertical offset between the photonic integrated circuit chip and the substrate to align the coupling waveguide with the optical fiber.

Various embodiments may provide a method of forming an optical assembly. The method may include providing a substrate. The substrate may include a first groove on a surface of the substrate, the first groove having a first lateral surface, a second lateral surface, and a base joining the first lateral surface and the second lateral surface. The substrate may also include a second groove on the surface of the substrate and parallel to the first groove of the substrate, the second groove having a first lateral surface, a second lateral surface, and a base joining the first lateral surface and the second lateral surface. The method may further include arranging or providing a photonic integrated circuit chip above or over the substrate with a surface of the photonic integrated circuit chip facing the surface of the substrate. The photonic integrated circuit chip may include a coupling waveguide. The photonic integrated circuit chip may further include a first groove on the surface of the photonic integrated circuit chip, the first groove having a first lateral surface, a second lateral surface, and a base joining the first lateral surface and the second lateral surface. The photonic integrated circuit chip may additionally include a second groove on the surface of the photonic integrated circuit chip and parallel to the first groove of the photonic integrated circuit chip, the second groove having a first lateral surface, a second lateral surface, and a base joining the first lateral surface and the second lateral surface.

The method may also include arranging or providing an optical fiber above or over the substrate and lateral to the photonic integrated circuit chip.

The method may additionally include arranging or providing a first cylindrical rod so that the first cylindrical rod has a first portion received by the first groove of the substrate and spaced from the base of the first groove of the substrate, a second portion received by the first groove of the photonic integrated circuit chip and spaced from the base of the first groove of the photonic integrated circuit chip, and a third portion between the first portion and the second portion.

The method may further include arranging or providing a second cylindrical rod so that the second cylindrical rod has a first portion received by the second groove of the substrate and spaced from the base of the second groove of the substrate, a second portion received by the second groove of the photonic integrated circuit chip, and a third portion between the first portion and the second portion.

The third portion of the first cylindrical rod and the third portion of the second cylindrical rod may define a desired vertical offset between the photonic integrated circuit chip and the substrate to align the coupling waveguide with the optical fiber.

BRIEF DESCRIPTION OF THE DRAWINGS

The invention will be better understood with reference to the detailed description when considered in conjunction with the non-limiting examples and the accompanying drawings, in which:

FIG. 3B is a schematic showing a cross-sectional side view of the optical assembly according to various embodiments.

DETAILED DESCRIPTION

Figure 1A:
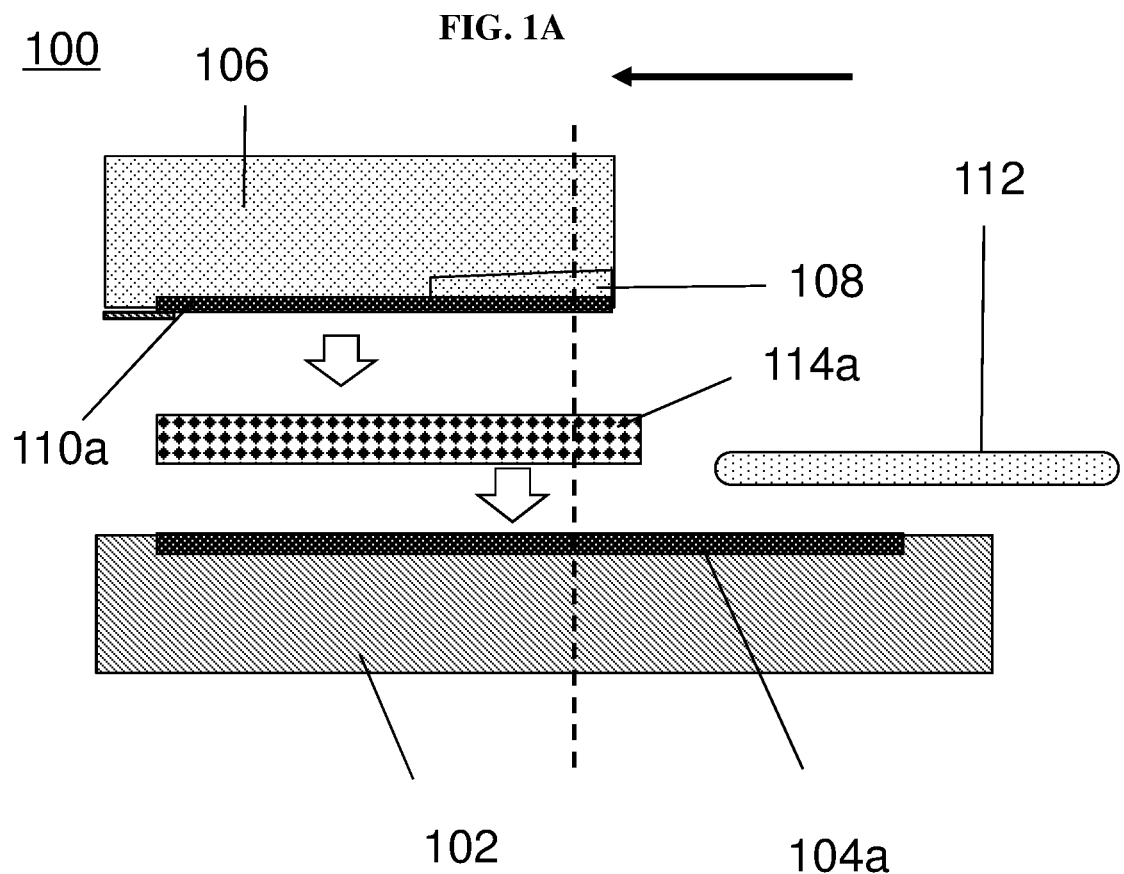
FIG. 1A shows a schematic of a cross-sectional side view of a non-fully assembled optical assembly according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or optical assemblies are analogously valid for the other methods or optical assemblies. Similarly, embodiments described in the context of a method are analogously valid for an optical assembly, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may also be used herein to mean that the deposited material may be formed "indirectly on" the implied side or surface with one or more additional layers being arranged between the implied side or surface and the deposited material. In other words, a first layer "over" a second layer may refer to the first layer directly on the second layer, or that the first layer and the second layer are separated by one or more intervening layers.

The optical assembly as described herein may be operable in various orientations, and thus it should be understood that the terms "top", "topmost", "bottom", "bottommost" etc., when used in the following description are used for convenience and to aid understanding of relative positions or directions, and not intended to limit the orientation of the optical assembly.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Various embodiments may provide an integrated structure that simplifies the alignment process of the fiber by using a set of grooves, e.g. U or V-grooves on substrate, e.g. silicon substrate with cylindrical rods, such as dummy optical fibers. Various embodiments may leverage on the submicron process accuracy of semiconductor or silicon technologies, and the dimensional precision accuracy of cylindrical rods, e.g. dummy optical fibers, to achieve the required optical alignment accuracy.

The speed of current optical transceivers is limited by the electrical connection between the PIC and the electronic integrated circuit (EIC). One of the solutions is to include through silicon vias (TSVs) on the PIC for the high-speed signal connection. The TSVs are formed on high resistivity substrates and the impedance are matched for optimum performance. Alternatively, the PIC can be connected through conventional wire bonds. However, wire bonds have a high inductance, and it may not be possible to match impedance up to 40 GHz.

Active circuits such as pre-emphasize and de-emphasize circuits are used to compensate the signal integrity distortion. These may lead to an undesirable increase in overall power consumption. Another plausible way of electrical connection is to use flip chip assembly with the PIC facing down on the substrate or interposer. Micro-bumps or solder balls are used in the flip chip, which can provide very low capacitance and may support very high-speed connection. The EIC is then integrated beside the PIC on the substrate or interposer. This may provide a very short interconnect length and may be desirable for high speed operation.

Various embodiments may provide a 2.5 dimensional (2.5D) interposer design that provides a more complete solution for the fiber optical coupling, as well as high speed integration of the EIC and PIC. Various embodiments may provide a compact and low-profile design. In various embodiments, the external laser source may be pig tailed and may be coupled to the PIC using a fiber block. Multiple fibers or fiber array may be integrated on the fiber block. In various embodiments, only one set of grooves and cylindrical rods or dummy fibers may be required for alignment of multiple optical fibers to the PIC. Depending on the process compatibility, the grooves may be of a U-groove design or a V-groove design.

Figure 1B:
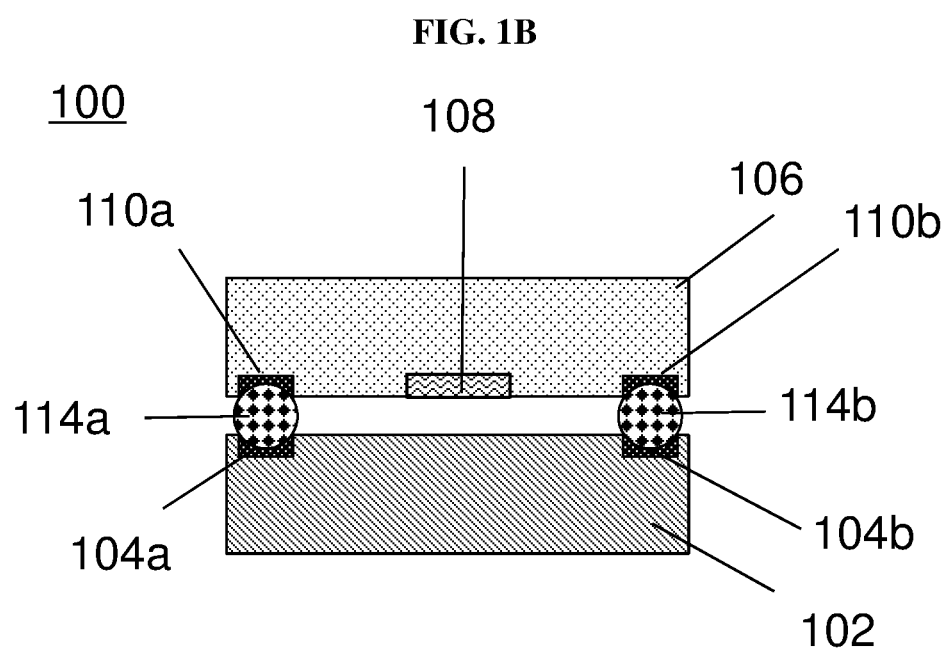
FIG. 1B shows a schematic of a cross-sectional front view of the optical assembly shown in FIG. 1A (with the various components put or integrated together) according to various embodiments.

FIG. 1A shows a schematic of a cross-sectional side view of a non-fully assembled optical assembly according to various embodiments. FIG. 1B shows a schematic of a cross-sectional front view of the optical assembly shown in FIG. 1A (with the various components put or integrated together) according to various embodiments. FIG. 1B may correspond to the view as indicated by the arrow in FIG. 1A across the dashed line.

The optical assembly 100 may include a substrate 102. The substrate 102 may include a first groove 104a on a surface of the substrate 102, the first groove 104a having a first lateral surface, a second lateral surface, and a base joining the first lateral surface and the second lateral surface.

The substrate 102 may also include a second groove 104b on the surface of the substrate 102 and parallel to the first groove 104a of the substrate 102, the second groove 104b having a first lateral surface, a second lateral surface, and a base joining the first lateral surface and the second lateral surface.

The optical assembly 100 may further include a photonic integrated circuit chip (PIC) 106 over or above the substrate 102 with a surface of the photonic integrated circuit chip 106 facing the surface of the substrate 102.

The photonic integrated circuit chip 106 may include a coupling waveguide 108 (or may include multiple coupling waveguides for multiple optical input/outputs (I/O) or channels). The photonic integrated circuit chip 106 may also include a first groove 110a on the surface of the photonic integrated circuit chip 106, the first groove 110a having a first lateral surface, a second lateral surface, and a base joining the first lateral surface and the second lateral surface. The photonic integrated circuit chip 106 may additionally include a second groove 110b on the surface of the photonic integrated circuit chip 106 and parallel to the first groove 110b of the photonic integrated circuit chip 106, the second groove 110b having a first lateral surface, a second lateral surface, and a base joining the first lateral surface and the second lateral surface.

The optical assembly 100 may also include an optical fiber (or may be a fiber array including multiple fibers for multiple optical I/O) 112 over or above the substrate 102 and lateral to the photonic integrated circuit chip 106. The optical assembly 100 may further include a first cylindrical rod 114a having a first portion received by the first groove 104a of the substrate 102 and spaced from the base of the first groove 104a of the substrate 102, a second portion received by the first groove 110a of the photonic integrated circuit chip 106 and spaced from the base of the first groove 110a of the photonic integrated circuit chip 106, and a third portion between the first portion and the second portion (of the first cylindrical rod 114a).

The optical assembly 100 may additionally include a second cylindrical rod 114b having a first portion received by the second groove 104b of the substrate 102 and spaced from the base of the second groove 104b of the substrate 102, a second portion received by the second groove 110b of the photonic integrated circuit chip 106, and a third portion between the first portion and the second portion (of the second cylindrical rod 114b). The rods 114a-b may be used to support the photonic integrated circuit chip 106.

The third portion of the first cylindrical rod 114a and the third portion of the second cylindrical rod 114b may define a (desired) vertical offset between the photonic integrated circuit chip 106 and the substrate 102 to align the coupling waveguide with the optical fiber.

In other words, the optical assembly may include a substrate 102, a photonic integrated chip 106, and an optical fiber 112. Cylindrical rods 114a, 114b may be used to align the photonic integrated chip 106 with the optical fiber 112. The cylindrical rods 114a, 114b may be provided in grooves 104a, 104b respectively on the substrate 102. The chip 106 may also include grooves 110a, 110b to couple with the cylindrical rods 114a, 114b respectively. Portions of the rods 114a, 114b may be received in the grooves 110a, 110b, 104a, 104b. Portion of the 114a, 114 not received in the grooves 110a, 110b, 104a, 104b may provide a vertical offset to space the photonic integrated chip 106 from the substrate 102.

As the lateral dimensions of the grooves 110a, 110b, 104a, 104b may be defined more precisely, and as cylindrical rods 114a, 114b, such as dummy optical fibers, have precise dimensions (i.e. the relationship between dimensions such as diameter and circumference etc. are precisely defined), the vertical offset between the photonic integrated chip 106 and the substrate 102 may be more precisely controlled by controlling the lateral dimensions of the grooves 110a, 110b, 104a, 104b.

In the current context, a "groove" as described herein may be a trench formed on a medium, such as substrate 102 or chip 106. The groove may be formed on the medium by removing material from the medium, e.g. by etching the medium. The groove may extend along the surface of the medium in one direction, and may be of any suitable cross-sectional shape. The groove may be of any suitable dimensions. For instance, the groove may have a cross-section having a "U" shape (i.e. a U-shaped groove), or a "V" shape (i.e. a V-shaped groove).

Figure 1C:
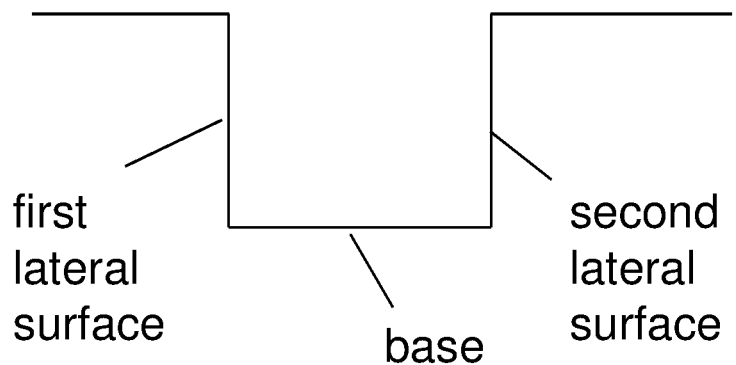
FIG. 1C shows a schematic of U-shaped grooves according to various embodiments.
Figure 1C:
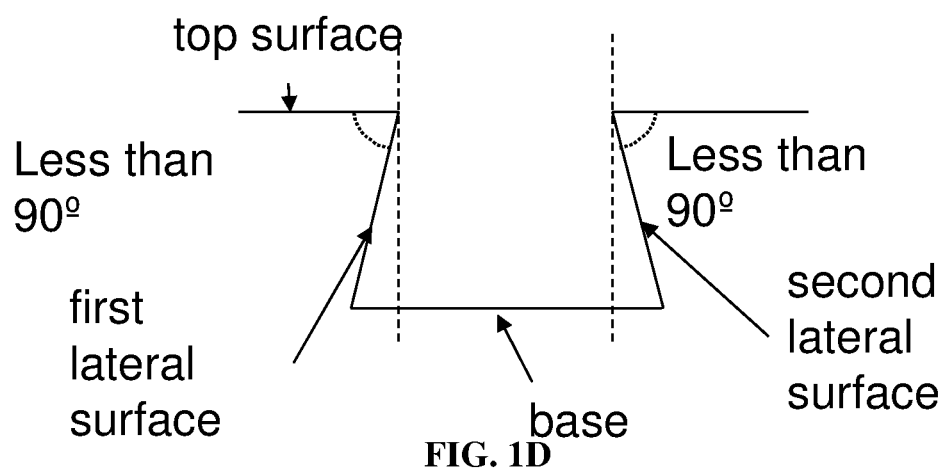

A U-shaped groove may be a groove in which the first lateral surface is substantially parallel to the second lateral surface, and in which the base is substantially perpendicular to the first lateral surface and the second lateral surface. A U-shaped groove may alternatively be a groove in which the first lateral surface away from the second lateral surface with increasing depth (i.e. as the distance from the surface of the medium increases), and the second lateral surface extends away from the first lateral surface with increasing depth. The first lateral surface or second lateral surface may be at an angle less than 90° from a top surface. FIG. 1C shows a schematic of U-shaped grooves according to various embodiments. A U-shaped groove may also be referred to as a U-groove.

Figure 1D:
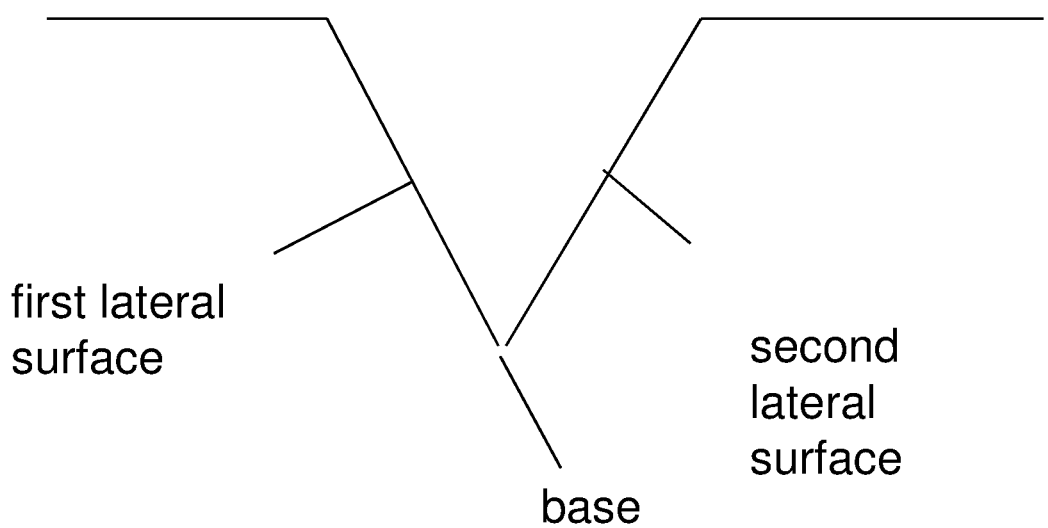
FIG. 1D shows a schematic of a V-shaped groove according to various embodiments.

A V-shaped groove may be a groove in which the first lateral surface extends towards the second lateral surface with increasing depth (i.e. as the distance from the surface of the medium increases), and the second lateral surface extends towards the first lateral surface with increasing depth. In various embodiments, the base of a V-shaped groove may be a line (i.e. in which the groove extends). The first lateral surface and the second surface may adjoin each other along the line, such that the cross-section is a "V" shape with a sharp inverted tip. FIG. 1D shows a schematic of a V-shaped groove according to various embodiments. A V-shaped groove may also be referred to as a V-groove.

Figure 1E:
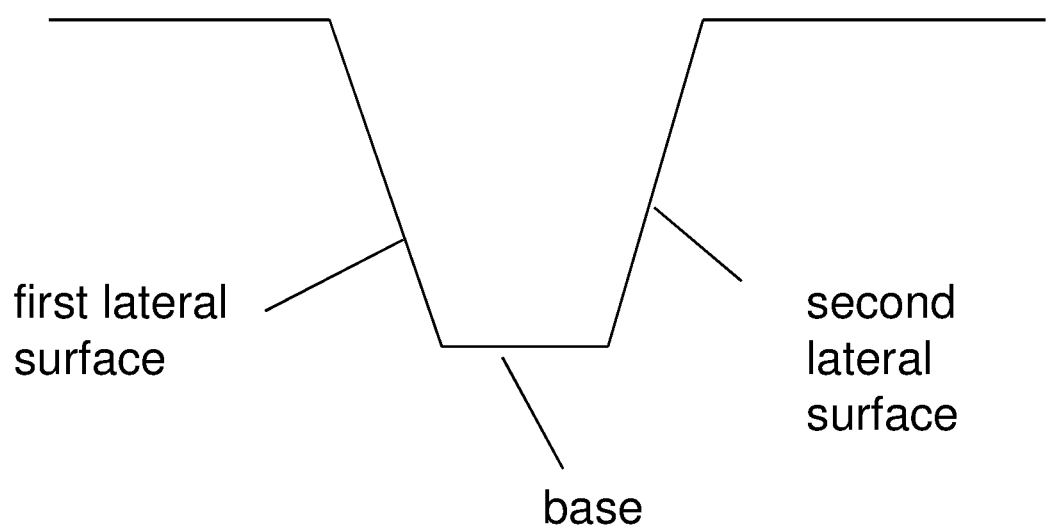
FIG. 1E shows a schematic of a V-shaped groove according to various embodiments.

In various other embodiments, the base of a V-shaped groove may be a planar surface that is substantially parallel to the surface of the medium, similar to a U-shaped groove. FIG. 1E shows a schematic of a V-shaped groove according to various embodiments. The V-shape groove as shown in FIG. 1E may also have a first lateral surface extending towards a second lateral surface with increasing depth (i.e. as the distance from the surface of the medium increases), and the second lateral surface extending towards the first lateral surface with increasing depth, but may have a base surface substantially parallel to the surface of the medium.

In various embodiments, the first groove 104a of the substrate 102 and the second groove 104b of the substrate 102 may be U-shaped grooves. In various other embodiments, the first groove 104a of the substrate 102a and the second groove 104b of the substrate 102 may be V-shaped grooves.

Similarly, in various embodiments, the first groove 110a of the photonic integrated circuit chip 106 and the second groove 110b of the photonic integrated circuit chip 106 may be U-shaped grooves. In various other embodiments, the first groove 110a of the photonic integrated circuit chip 106 and the second groove 110b of the photonic integrated circuit chip 106 may be V-shaped grooves.

The shape of grooves 104a, 104b may be the same or may be different from the shape of grooves 110a, 110b.

In various embodiments, a height of the third portion of the first cylindrical rod 114a or the second cylindrical rod 114b may be equal to the vertical offset.

The optical fiber 112 may be used to carry optical signals to the photonic integrated chip 106 or from the photonic integrated chip 106 during operation. The optical fiber 112 may alternatively be referred to as a signal fiber.

A "cylindrical rod" may be an elongated rod with a circular cross-section. The "cylindrical rod" may be rigid, and may serve to support or hold the photonic integrated chip 106 and/or a fiber block so that the photonic integrated chip 106 and/or the fiber block is spaced from the substrate 102. The "cylindical rod" may be a dummy optical fiber or dummy fiber. The dummy optical fiber or dummy fiber may be used as mechanical support (i.e. to support or hold the photonic integrated chip 106 and/or the fiber block), and may not carry optical signals during operation of the optical assembly 100.

In various embodiments, the first cylindrical rod 114a may be spaced from the base of the first groove 104a of the substrate 102, i.e. the rod 114a may not be in direct physical contact with the base of the first groove 104a of the substrate 102. The first cylindrical rod 114a may also be spaced from the base of the first groove 110a of the photonic integrated chip 106, i.e. the rod 114a may not be in direct physical contact with the base of the first groove 110a of the photonic integrated chip 106.

Similarly, the second cylindrical rod 114b may be spaced from the base of the second groove 104b of the substrate 102, i.e. the rod 114b may not be in direct physical contact with the base of the second groove 104b of the substrate 102. The second cylindrical rod 114b may also be spaced from the base of the second groove 110b of the photonic integrated chip 106, i.e. the rod 114b may not be in direct physical contact with the base of the second groove 110a of the photonic integrated chip 106.

In various embodiments, the first cylindrical rod 114a may be held by the first lateral surface of the first groove 104a of the substrate 102 and the second lateral surface of the first groove 104a of the substrate 102, so that the first portion of the first cylindrical rod 114a is spaced from the base of the first groove 104a of the substrate 102. The first cylindrical rod 114a may be held by the first lateral surface of the first groove 110a of the photonic integrated circuit chip 106 and the second lateral surface of the first groove 110a of the photonic integrated circuit chip 106, so that the second portion of the first cylindrical rod 114a is spaced from the base of the first groove 104a of the photonic integrated circuit chip 106.

The second cylindrical rod 114b may be held by the first lateral surface of the second groove 104b of the substrate 102 and the second lateral surface of the second groove 104b of the substrate 102, so that the first portion of the second cylindrical rod 114b is spaced from the base of the second groove 104b of the substrate 102.

The second cylindrical rod 114b may be held by the first lateral surface of the second groove 110b of the photonic integrated circuit chip 106 and the second lateral surface of the second groove 110b of the photonic integrated circuit chip 106, so that the second portion of the second cylindrical rod 114b is spaced from the base of the second groove 110b of the photonic integrated circuit chip 106.

In various other embodiments, the first cylindrical rod 114a may be held by a corner formed by the first lateral surface of the first groove 104a of the substrate 102 and the surface of the substrate 102 (i.e. the surface facing the photonic integrated chip 106), and a corner formed by the second lateral surface of the first groove 104b of the substrate and the surface of the substrate 102, so that the first portion of the first cylindrical rod 114a is spaced from the base of the first groove 104a of the substrate 102.

The first cylindrical rod 114a may be held by a corner formed by the first lateral surface of the first groove 110a of the photonic integrated circuit chip 106 and the surface of the photonic integrated circuit chip 106 (i.e. the surface facing the substrate 102), and a corner formed by the second lateral surface of the first groove 110a of the photonic integrated circuit chip 106 and the surface of the photonic integrated circuit chip 106, so that the second portion of the first cylindrical rod 110a is spaced from the base of the first groove 110a of the photonic integrated circuit chip 106.

The second cylindrical rod 114b may be held by a corner formed by the first lateral surface of the second groove 104b of the substrate 102 and the surface of the substrate 102 (i.e. the surface facing the photonic integrated chip 106), and a corner formed by the second lateral surface of the second groove 104b of the substrate 102 and the surface of the substrate 102, so that the first portion of the second cylindrical rod 114b is spaced from the base of the second groove 104b of the substrate 102.

The second cylindrical rod 114b may be held by a corner formed by the first lateral surface of the second groove 110b of the photonic integrated circuit chip and the surface of the photonic integrated chip 106 (i.e. the surface facing the substrate 102), and a corner formed by the second lateral surface of the second groove 110b of the photonic integrated circuit chip 106 and the surface of the photonic integrated circuit chip 106, so that the second portion of the second cylindrical rod 114b is spaced from the base of the second groove 110b of the photonic integrated circuit chip 106.

In various embodiments, the coupling waveguide 108 may be aligned with the optical fiber 112 so that light is coupled in a direction parallel to the surface of the substrate 102 between the coupling waveguide 108 and the optical fiber 112. In other words, the coupling waveguide 108 may be edged or horizontally coupled to the optical fiber 112. For edge or horizontal coupling, light may travel parallel to the substrate 102 from the waveguide 108 to the fiber 112, or from the fiber 112 to the waveguide 108.

In various other embodiments, the coupling waveguide 108 may be aligned with the optical fiber 112 so that light is coupled in a direction out of plane or perpendicular to the surface of the substrate 102 between the coupling waveguide 108 and the optical fiber 112. For vertical coupling, light may travel out of plane or perpendicular to the surface of the substrate 102 from the waveguide 108 to the fiber 112, or from the fiber 112 to the waveguide 108.

The photonic integrated circuit chip 106 may include a grating coupler optically coupled to the coupling waveguide 108. The substrate 102 may include a grating coupler optically coupled to the optical fiber 112.

In various embodiments, the photonic integrated circuit chip 106 may include one or more further coupling waveguides. The coupling waveguide 108 and the one or more further waveguides may form a waveguide array (for multiple channels).

The optical assembly 100 may further include one or more further optical fibers above or over the substrate 102 and lateral to the photonic integrated circuit chip 106. The substrate 102 may include one or more further grating couplers, each of the one or more grating couplers optically coupled to a respective further optical fiber of the one or more further optical fibers.

In various embodiments, the optical assembly 100 may include a fiber block above or over the substrate 102 and lateral to the photonic integrated circuit chip 106. The optical fiber 112 may be coupled to the fiber block. The fiber 112 may be held by the fiber block. The optical assembly 100 may further include one or more further optical fibers coupled to or held by the fiber block, so that the optical fiber 112 and the one or more optical fibers form a fiber array. The fiber block may include a suitable material such as polydimethysiloxane (PDMS), glass or silicon.

The fiber block may include a first groove, the first groove having a first lateral surface, a second lateral surface, and a base joining the first lateral surface and the second lateral surface. The fiber block may further include a second groove parallel to the first groove (of the fiber block), the second groove having a first lateral surface, a second lateral surface, and a base joining the first lateral surface and the second lateral surface.

The coupling waveguide 108 or waveguide array may be aligned to the optical fiber 112 or fiber array. The coupling between the coupling waveguide 108 or waveguide array and the optical fiber 112 or fiber array may be edge/horizontal coupling, or vertical coupling. The photonic integrated circuit chip 106 may also include one or more further grating couplers (to form a plurality of grating couplers). The plurality of grating couplers included in the chip 106 may be optically coupled to the waveguide array. The substrate 102 may also include one or more further grating couplers (to form a plurality of grating couplers). The plurality of grating couple included in the substrate 102 may be optically coupled to the fiber array.

In various embodiments, the first cylindrical rod 114a may also be received by the first groove of the fiber block and spaced from the base of the first groove of the fiber block, i.e. the rod 114a may not be in direct physical contact with the base of the first groove of the fiber block. The second cylindrical rod 14b may also be received by the second groove of the fiber block and spaced from the base of the second groove of the fiber block, i.e. the rod 114b may not be in direct physical contact with the base of the second groove of the fiber block. The first cylindrical rod 114a and the second cylindrical rod 114b may extend from (under) the photonic integrated circuit 106 to (under) the fiber block.

The grooves 104a, 104b on the substrate may also extend from (under) the photonic integrated circuit 106 to (under) the fiber block. The first cylindrical rod 114a and the second cylindrical rod 114b may be used to align both the photonic integrated circuit 106 and the fiber block.

A portion of the first cylindrical rod 114a may be received by the first groove 104a of the substrate 102, and a portion of the second cylindrical rod 114b may be received by the second groove 104b of the substrate 102. A further portion of the first cylindrical rod 114a may be received by the first groove of the fiber block, and a further portion of the second cylindrical rod may be received by the second groove of the fiber block. Another portion of the first cylindrical rod 114a between the portion and the further portion (of rod 114a), as well as another portion of the second cylindrical rod 114b between the portion and the further portion (of rod 114b) may define a vertical offset of the fiber block from the substrate 102. The cylindrical rods 114a, 114b may be held by the lateral surfaces of the grooves of the substrate or fiber block, or corners from by the lateral surfaces and main surface of the substrate or fiber block.

In various other embodiments, the substrate 102 may further include a third groove on the surface of the substrate 102, the third groove having a first lateral surface, a second lateral surface, and a base joining the first lateral surface and the second lateral surface. The substrate 102 may also include a fourth groove on the surface of the substrate and parallel to the third groove of the substrate, the fourth groove having a first lateral surface, a second lateral surface, and a base joining the first lateral surface and the second lateral surface.

The third groove or fourth groove of the substrate 102 may be distinct and discontinuous from the first groove 104a or the second groove 104b of the substrate 102.

The optical assembly 100 may further include a third cylindrical rod having a first portion received by the third groove of the substrate 102 and spaced from the base of the third groove of the substrate 102 (i.e. not in direct physical contact with the base of the third groove), a second portion received by the first groove of the fiber block and spaced from the base of the first groove of the fiber block (i.e. not in direct physical contact with the base of the first groove), and a third portion between the first portion and the second portion (of the third cylindrical rod).

The optical assembly may also include a fourth cylindrical rod having a first portion received by the fourth groove of the substrate 102 and spaced from the base of the fourth groove of the substrate 102 (i.e. not in direct physical contact with the base of the third groove), a second portion received by the second groove of the fiber block and spaced from the base of the second groove of the fiber block (i.e. not in direct physical contact with the base of the second groove), and a third portion between the first portion and the second portion (of the fourth cylindrical rod).

The third cylindrical rod and fourth cylindrical rod may be held by the lateral surfaces of the grooves of the substrate or fiber block, or corners from by the lateral surfaces and main surface of the substrate or fiber block.

In various embodiments, the substrate 102 may include a through hole directly below the optical fiber 112. The through hole may include matching gel. The matching gel may be applied to the through hole so that the matching gel is between the optical wave guide and the signal fiber.

In various embodiments, a groove as described herein may include an adhesive such as epoxy to hold a cylindrical rod. For instance, the first groove 104a of the substrate 102 may include an adhesive such as epoxy to hold the first cylindrical rod 114a. The second groove of the substrate may include an adhesive such as epoxy to hold the second cylindrical rod 114b.

In various embodiments, the substrate 102 may include a signal fiber groove (or multiple grooves for signal fiber array). The optical fiber 112 may be on or may be held by the signal fiber groove. The signal fiber groove or each signal fiber groove may be a U-groove or a V-groove.

In various embodiments, the optical fiber 112 may be coupled or attached to the fiber block. The fiber block may include a groove configured to hold or accommodate the optical fiber 112, or multiple grooves to hold or accommodate the optical fibers of the fiber array. The groove or each groove included in the fiber block for holding or accommodating the optical fiber 112 or optical fibers may be a U-groove or a V-groove.

The photonic integrated circuit chip 106 may include one or more electrical interconnects, such as flip chip contacts, micro bumps, copper pillars etc.

The substrate 102 may include one or more electrical interconnects, such as vias, interconnection lines etc.

The optical assembly 100 may include one or more electrical connections, such as wirebonds, connecting the one or more electrical interconnects of the substrate 102 and the one or more electrical interconnects of the photonic integrated circuit chip 106. First ends of the wirebonds may be coupled to (the one or more interconnects of) the substrate 102, and second ends of the wirebonds may be coupled to (the one or more interconnects of) the photonic integrated circuit chip 106.

The PIC chip 106 may include one or more additional grooves. The one or more additional grooves may be formed perpendicular to the grooves 110a, 110b. The substrate 102 may also include one or more additional grooves, e.g. formed perpendicular to grooves 104a, 104b. The assembly 100 may further include one or more locking cylindrical rods between the one or more additional grooves of the PIC chip 106 and the one or more additional grooves of the substrate 102.

Several designs of protrusions or the negative of V-grooves have been developed for optical passive alignment. However, the fabrication of protrusions is complex and the accuracy is a concern. Alignment pins on V-grooves have also been used to align optical circuits of two substrates laterally. However, as such V-grooves do not provide Z-axis control, the two substrates may be required to have the same thickness. In another design, pyramidal detents have been designed on both top and bottom substrates and supported by spherical objects for vertical coupling self-alignment. The spherical objects are costly and may require at least quantity of 3 sets to work. In addition, the standoff height is much larger due to the larger diameter of the spherical object. Apart for the optical coupling, the electrical connection is also important for photonic integrated circuit chip (PIC) assemblies. In a previous work, the electrical connection may be realized using mechanically flexible interconnects. In another previous design, the electrical connection may be the contacts between the electro plates. These two types of electrical connections may not be suitable for mass production. In addition, these electrical connections may not be suitable for high speed operation which requires large bandwidth. Recently, V-groove fabricated on PIC has been demonstrated. In this design, a polymer lid is used to hold the fibers at the required position before being assembled on the V-grooves. Although such a design does not require a silicon interposer, it requires a significant PIC area, thus increasing costs.

Figure 2A:
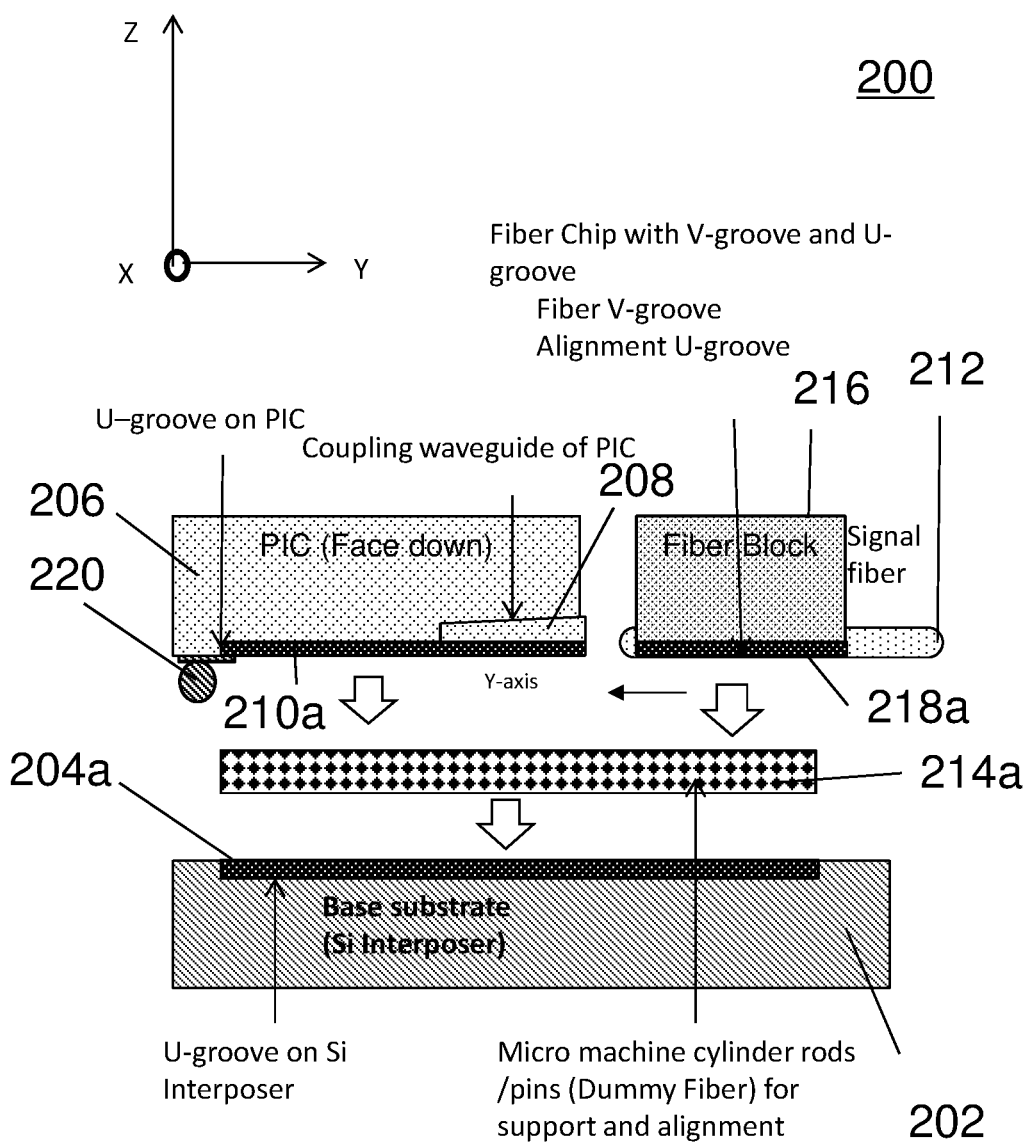
FIG. 2A shows a schematic of a cross-sectional side view of an optical assembly according to various embodiments.
Figure 2B:
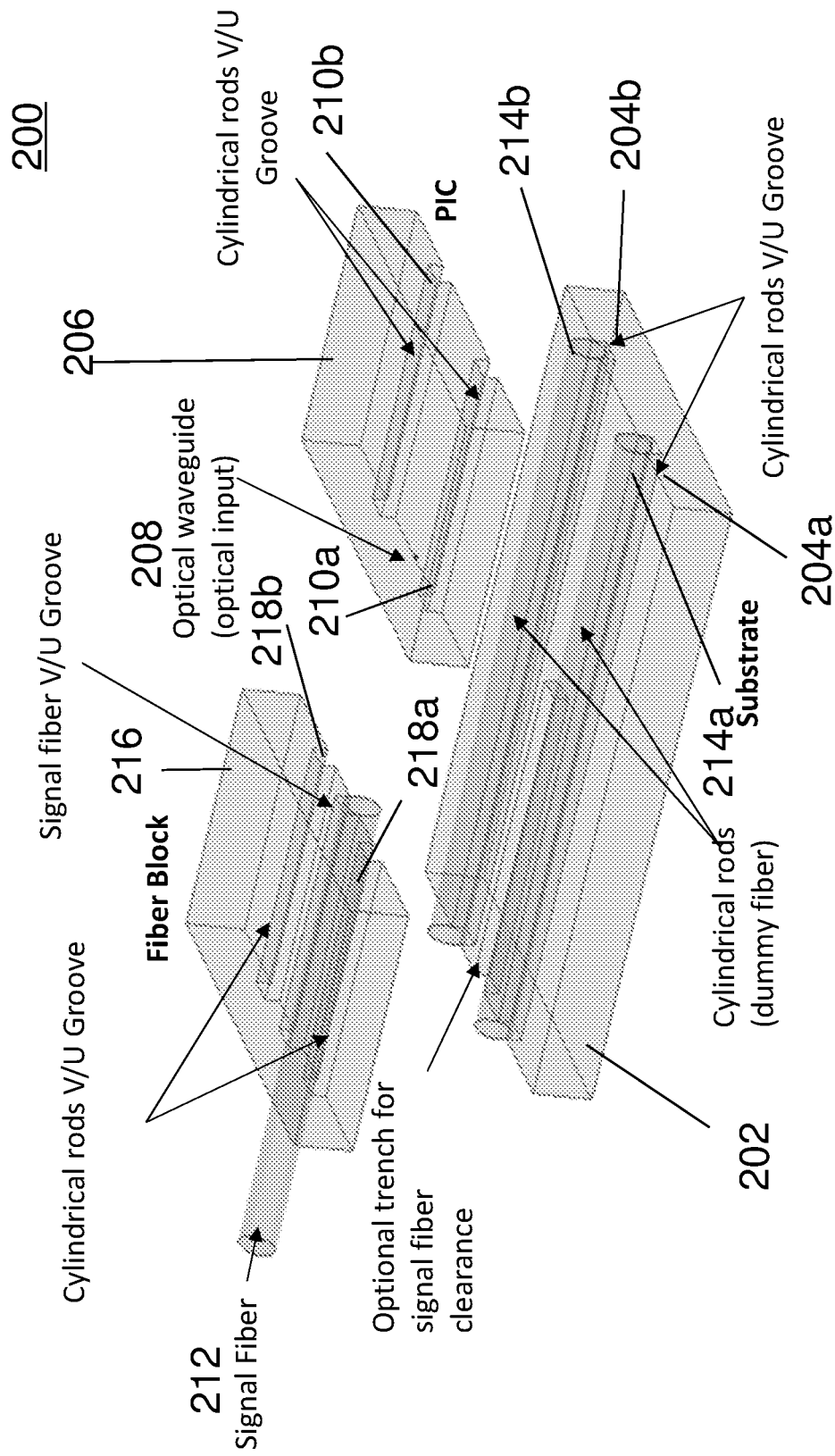
FIG. 2B is a schematic showing a perspective view of the optical assembly according to various embodiments.

FIG. 2A shows a schematic of a cross-sectional side view of an optical assembly 200 according to various embodiments. FIG. 2B is a schematic showing a perspective view of the optical assembly 200 according to various embodiments. The integration structure 200 may include a photonic integrated chip (PIC) 206, a base substrate 200 such as a silicon interposer, and a fiber block 216, which houses an optical fiber 212, for instance in a V-groove.

U-grooves 204a-b, 210a-b, 218a-b with width (Wu) defined by photolithography masks may be fabricated on the top surface of the silicon interposer 202, the active surface of the PIC 206, and the surface of the fiber block 216 with the V-groove, i.e. along the Y-axis as shown FIG. 2A.

The U-grooves 204a-b, 210a-b, 218a-b may be used to support micro machined cylindrical rods or pins 214a-b. Standard fibers of 125 µm diameter (Ø)±0.7 µm may be used as a low cost alternative of micro machined cylindrical pins. When the PIC 206 and the fiber block 216 are assembled over the interposer 202 supported by the dummy fibers 214a-b, their X, Z and angular positions may be self-aligned by the cylindrical surfaces of the dummy fibers 214a-b, as well as the edges of the U-grooves 204a-b, 210a-b, 218a-b.

Along the Z-axis, the PIC 206 and the fiber block 216 may be physically separated from the silicon interposer 202 by the dummy fibers 214a-b by a standoff height (h), and this standoff height (h) may be co-designed with sizes of micro bumps 220 for optimum electrical connections and maximum self-alignment range. The Y position of the PIC 206 and the fiber block 216 may be allowed to be fine-tuned during the assembly so that it can compensate the dimensional dicing tolerance of the PIC. In this way, a semi passive alignment design may be achieved. If the Y position is required to be aligned or locked passively, additional U-grooves and cylindrical rods can be designed along the X-axis. Additional rods may be arranged or positioned in contact with the additional U-grooves or V-grooves.

The interposer 202 may also include electrical interconnects such as through silicon vias (TSVs) and redistribution layers/backend of line contacts (RDL/BEOL contacts) for full electrical integration. The PIC 206 may be assembled flip chip face down for optical alignment. The PIC 206 may not require any TSV.

This may simplify the PIC fabrication process and may at the same time allow a high frequency electrical connection to the substrate 202 using flip chip bonding instead of wire bonds. The PIC 206 may be flip chip bonded to the substrate 202 using micro bumps 220 which have low capacitance and inductance. These bumps 220 may be designed between the two U-grooves 204a, 204b so that they can be electrically routed to the active circuit of the PIC 206.

At least a set of two grooves may be required on each of the PIC 206, the fiber block 216, and the base substrate 202. Depending on the design requirement, the grooves may be continuous along the side or may break into multiple groove sections. Each groove section may then require a separate cylindrical rod or dummy fiber. The grooves on the PIC 206 and substrate 202 may be of different dimensions.

Figure 2C:
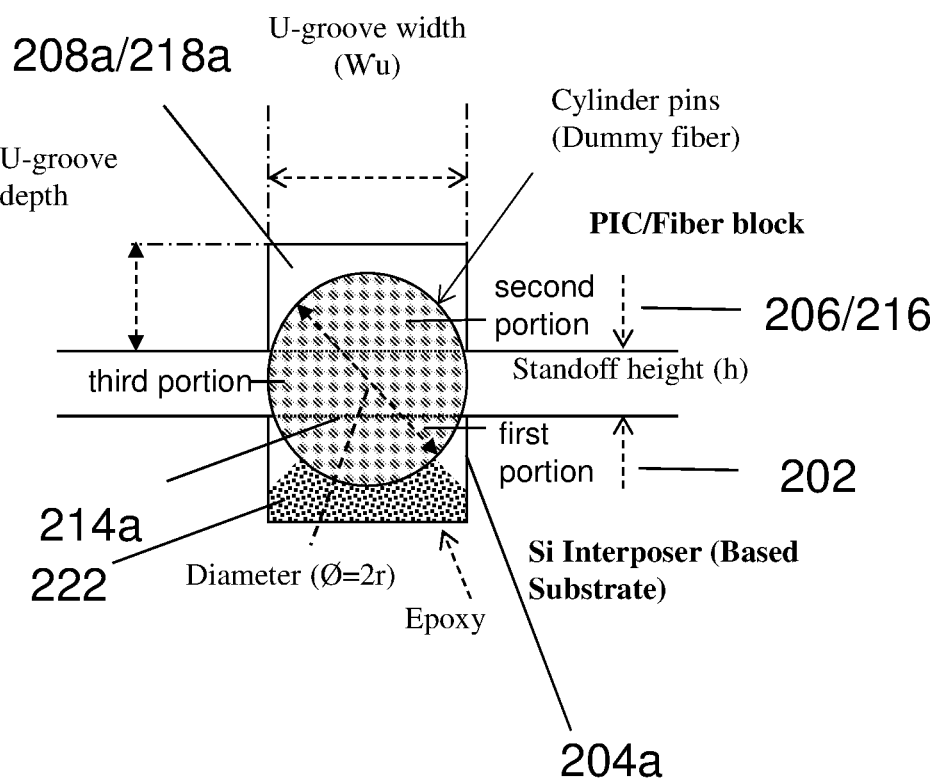
FIG. 2C shows a schematic of a cross-sectional front view of a photonic integrated circuit/fiber block coupled to the substrate via a cylindrical rod according to various embodiments.

FIG. 2C shows a schematic of a cross-sectional front view of a photonic integrated circuit 206/fiber block 216 coupled to the substrate 202 via a cylindrical rod 214a according to various embodiments. An adhesive 222 such as epoxy may be used to adhere rod 214a to the groove 204a.

The dimensions of the U-groove 204a, 208a, 218a may be determined using the standard geometry equation:

$$\left(\frac{Wu}{2}\right)^2 = r^2 - h^2 \tag{1}$$

where Wu is the lateral width of the groove 204a, 208a, 218a, r is the radius of the rod 214a, and h is the vertical offset or standoff height between the photonic integrated circuit 206/fiber block 216 and the substrate 202.

The vertical offset or standoff height may be defined by the third portion of the rod 214a as shown in FIG. 2C.

Figure 2D:
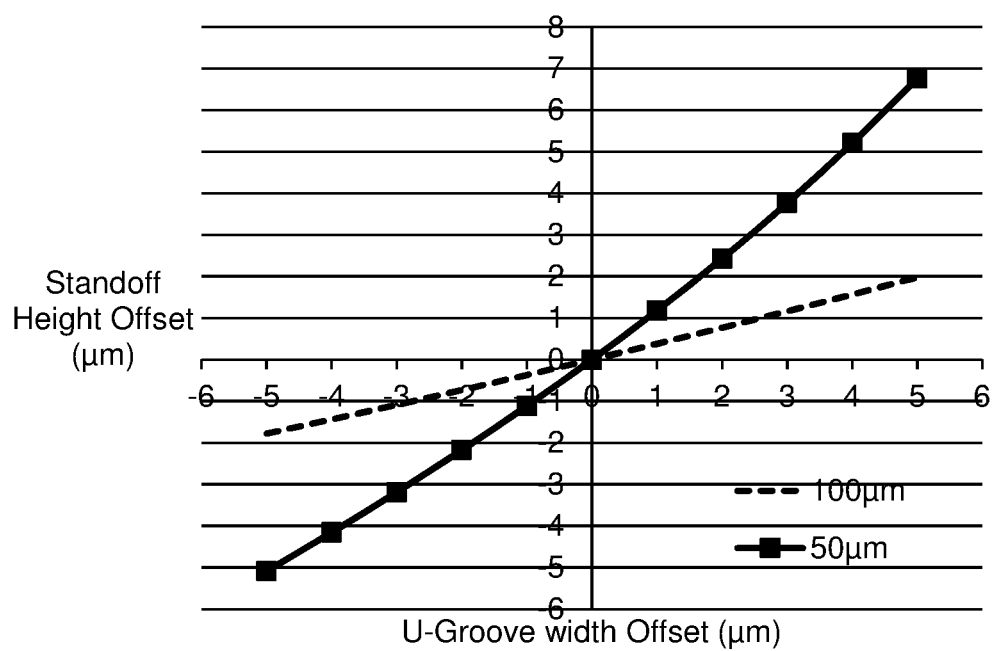
FIG. 2D is a plot of standoff height offset (in micrometers or m) as a function of U-groove width offset (in micrometers or μm) illustrating the relation of the standoff height error with respect to the U-groove width error for the range of t5 μm for standoff height design of 50 μm and 100 μm.

FIG. 2D is a plot of standoff height offset (in micrometers or µm) as a function of U-groove width offset (in micrometers or µm) illustrating the relation of the standoff height error with respect to the U-groove width error for the range of 5 µm for standoff height design of 50 µm and 100 µm according to various embodiments. The standoff height error with respect to the U-groove error may be a function of standoff height design. Due to the circular curve surface of the dummy fiber, the magnitude of standoff error may increase when the standoff height is reduced.

This U-groove width offset of grooves 204a, 204b in the substrate 200 may not affect the optical coupling efficiency as both the PIC 206 and the fiber block 216 are sitting in the same set of U-grooves, and both PIC 206 and the fiber block 216 may have the same vertical offset. Accordingly, there may not be any height difference between the PIC 206 and the fiber block 216 due to differences in the lateral width of grooves 204a, 204b, and hence there may not be an effect on coupling efficiency.

If this offset error occurs grooves 210a, 210b in the PIC 206 or grooves 218a, 218b in the fiber block 216, the alignment accuracy of the fiber 212 and the waveguide 208 may be affected. However, with submicron fabrication accuracy of grooves 210a, 210b, 218a, 218b, this offset error may be controlled very well.

Nevertheless, this standoff height error may be minimized by designing different U-groove widths for the substrate 202, and the PIC 206 and fiber block 216. This methodology may apply for situation where the standoff height and the diameter of the dummy rods 214a, 214b are fixed. As the width error of the U-groove in the substrate 202 does not affect the optical alignment, the width may be designed to be large or as large as possible. For the U-grooves of the PIC 206 and the U-grooves of the fiber block 216 which have an impact on the optical alignment, they may be designed as small as possible. The larger widths of the U-grooves on the substrate 202 may help compensate the height offset difference caused by the smaller widths of the U-grooves of the PIC 206 and/or the U-grooves of the fiber block 216.

Figure 2E:
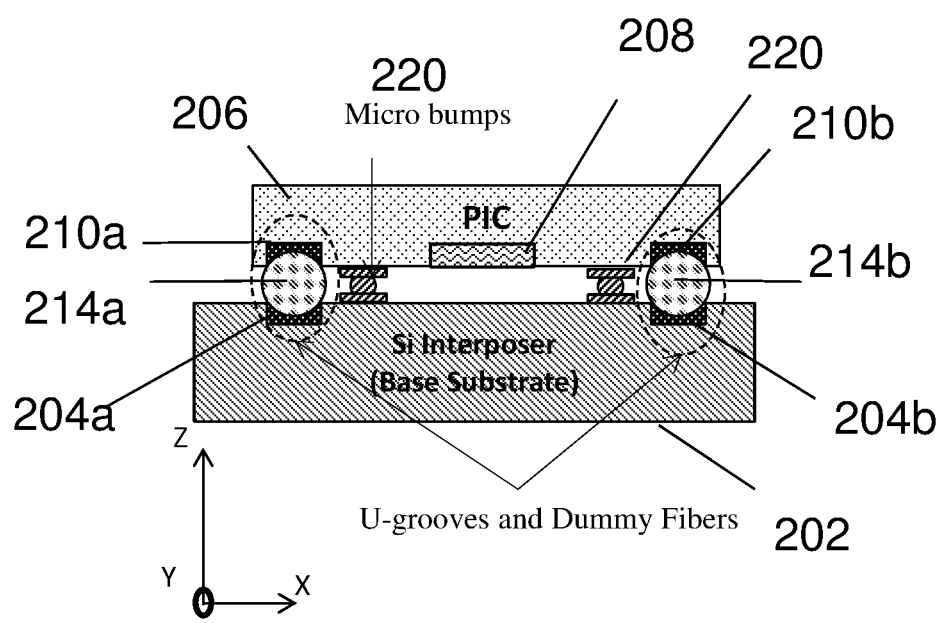
FIG. 2E is a schematic showing a cross-sectional front view of the optical assembly shown in FIG. 2A according to various embodiments.

FIG. 2E is a schematic showing a cross-sectional front view of the optical assembly 200 shown in FIG. 2A according to various embodiments. The PIC 206 may be faced down and flip chip assembled onto the silicon interposer 202. Micro-bumps or copper pillars 220 may be used for the electrical connection of the PIC 206. The micro-bumps 220 may be solder bumps. The heights of these micro-bumps 220 may be designed to be slightly higher than the standoff height (h) so that when the micro-bumps 220 thermal compressed, their height may be set by the standoff height. In order to enhance the solder joint reliability, solder joints may be formed or designed at the edges of the PIC 206. The solder joints may then be routed either to the back or front of the silicon interposer 202. Depending on the system requirements, through silicon vias (TSVs) may be built on the silicon interposer 202 to provide better performance.

Figure 2F:
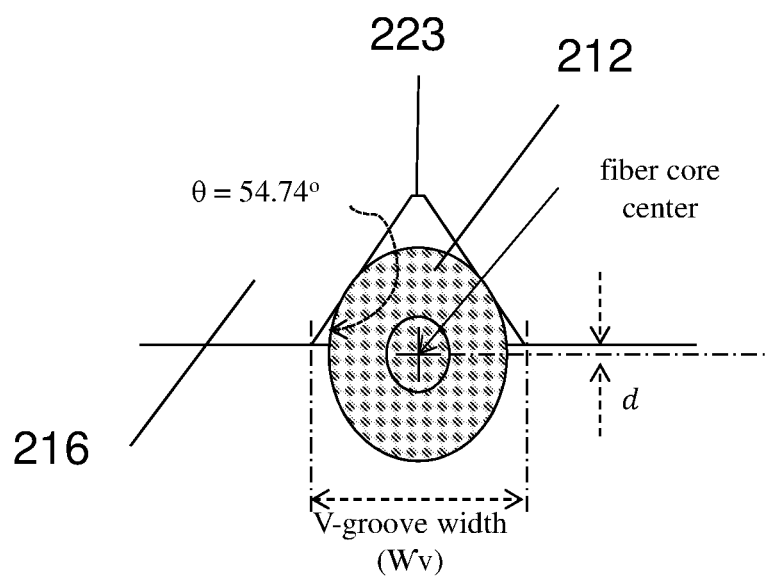
FIG. 2F is a schematic of the fiber block including a V-groove to hold the signal fiber according to various embodiments.

The fiber block 216 may include a U-groove or a V-groove 223 to hold the signal fiber 212. If the fiber center or the optical axis is lower or near the surface of the block 216, a V-groove may be needed. FIG. 2F is a schematic of the fiber block 216 including a V-groove to hold the signal fiber 212 according to various embodiments.

A standard fiber may have a diameter Ø of 125 µm (r of 62.5 µm). The V-groove parameters may be denoted as Wv, the width of the V-groove at the top surface, and θ, the crystallographically defined angle (54.74°). The fiber 212 may be placed in the groove such that it contacts the side walls at two points. The distance (d) between the fiber core center and the surface of the fiber block 216 may be provided by:

$$d = \frac{r}{\sin\theta} - \frac{Wv}{2\tan\theta} \quad (3)$$

The accuracy of the V-groove designed for fiber to waveguide coupling has been analyzed previously. The V-groove width may be controlled to 1 µm and the expected position offset may be ≤0.7 µm, and the corresponding excess loss may be 0.1 dB.

Figure 2G:
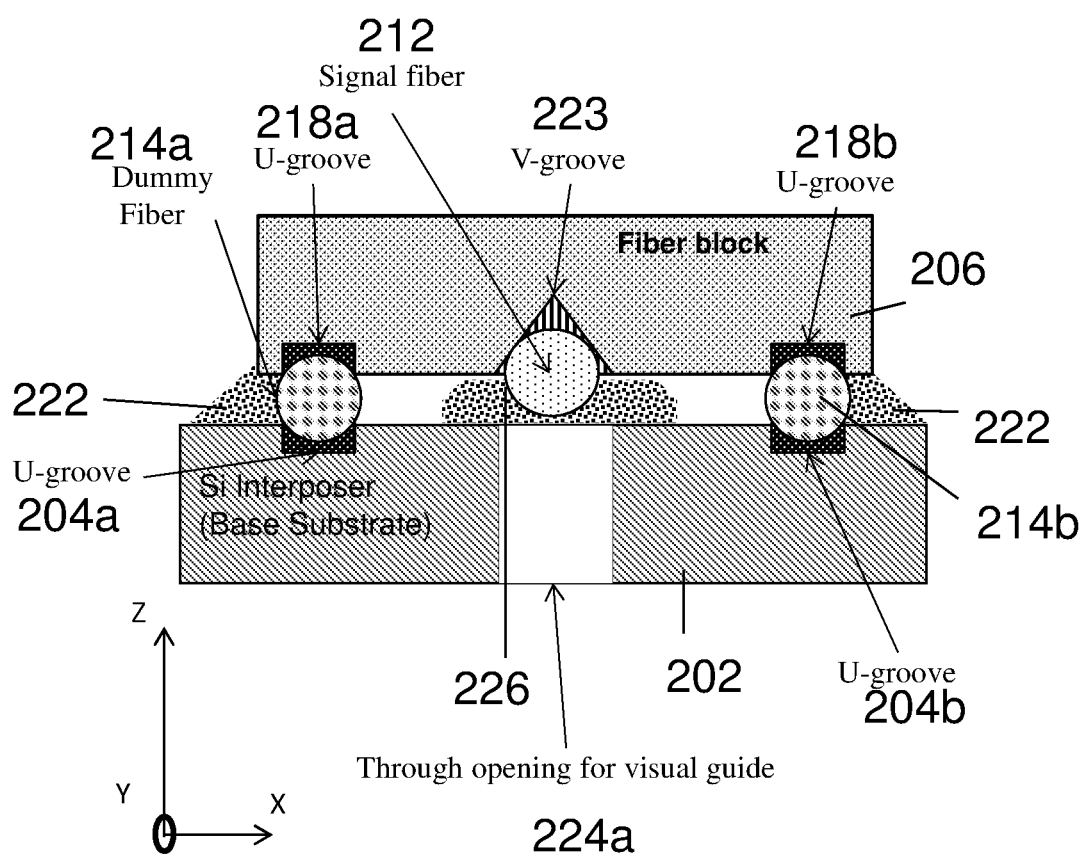
FIG. 2G is a schematic showing a cross-sectional front view of the optical assembly shown in FIG. 2A according to various embodiments.

FIG. 2G is a schematic showing a cross-sectional front view of the optical assembly 200 shown in FIG. 2A according to various embodiments. FIG. 2G shows the fiber block 216 assembled onto the silicon interposer 202. The fiber block 216 has U-grooves 218a, 218b, while the substrate 202 has U-grooves 204a, 204b. Rods 214a, 214b may provide a vertical off set between the fiber block 216 and the substrate 202. Rod 214a may be held by grooves 214a, 218a, while rod 214b may be held by grooves 214b, 218b. A through hole or opening 224a may be formed extending from a first surface of the substrate to a second surface of the substrate 202 opposite the first surface. Optical adhesive 222 or thermal compression may be used to attach the fiber block 216 to the silicon interposer 202 during assembly. Underfill 226, such as a polymer-based adhesive, may be used to enhance the strength of the signal fiber 212 after the attachment. The signal fiber may be held by groove 223. In various embodiments, multiple signal fibers of a signal fiber array may be held by a groove array including multiple grooves.

In various embodiments, a method of forming the optical assembly 200 may be as follows:
(1) The two rods 214a, 214b, e.g. dummy fibers, may be first assembled onto the silicon interposer 202 with epoxy 222. The epoxy 222 may be applied onto the bottom surface of the dummy fibers 214a, 214b and the bottom trench surfaces of the U-grooves 204a, 204b. Care may need to be taken so that no epoxy is with the edge of the U-grooves 204a, 204b. In various embodiments, the dummy fibers 214a, 214b may not be required to the substrate grooves 204a, 204b using epoxy. This is because the dummy fibers 214a, 214b may be subsequently sandwiched by the PIC/fiber block and the substrate which are held together with solder bumps or epoxy.
(2) The PIC 206 may be flip chip assembled to the silicon interposer 202. The edges of both the U-grooves 210a, 210b may be in contact with the two dummy fibers 214a, 214b during the reflow process so that the position of the PIC 206 may be self-aligned.
(3) The fiber block 216 with the signal fiber 212 preassembled may then be placed onto the silicon interposer 202, supported by the dummy fibers 214a, 214b. The fiber block 216 may then be adjusted along the Y-axis guided by the dummy fibers 214a, 214b towards the PIC 206 as close as possible. The dummy fiber 214a may be received by groove 218a, and the dummy fiber 214b may be received by groove 218b. Active alignment may be carried out for the adjustment along the Y-axis. An adhesive 222 such as epoxy may then be applied to secure the fiber block 216 to the silicon interposer 202. Suitable underfill material 226 may be applied between the fiber block 216 and the silicon interposer 202 as shown in FIG. 2G to enhance mechanical support of the signal fiber 212.
(4) A through hole 224a may be fabricated on the silicon interposer 202 at the coupling area for better coupling. Matching gel, such as a silicone based matching gel, may be applied through the hole 224a to improve coupling efficiency.

With the self-alignment of the U-grooves 204a-b, 210a-b, 218a-b, and the dummy fibers 214a-b, which control the positions of the PIC 206 and the fiber block 216, and the high accuracy of the V-groove 223 which holds the signal fiber 212, the design shown in FIGS. 2A-G may help to reduce the alignment time between fiber 212 to the waveguide 208.

The optical alignment process may be passive and may rely on the dummy fibers 214a-b and the U-grooves 204a-b, 210a-b, 218a-b. However, additional features may be designed on the silicon interposer 202 if necessary to assist in the optical alignment. The area of the interposer 202 directly under the interface between the PIC 206 and fiber block 216 may be etched away to form a through hole for visual guide during alignment. Alternatively, alignment marks of the optical inputs of the PIC 206 may also be transferred onto the top surface of the silicon interposer 202. Matching alignment marks may be made on the substrate 202 and the PIC 206/fiber block 216 for flip chip assembly.

Figure 2H:
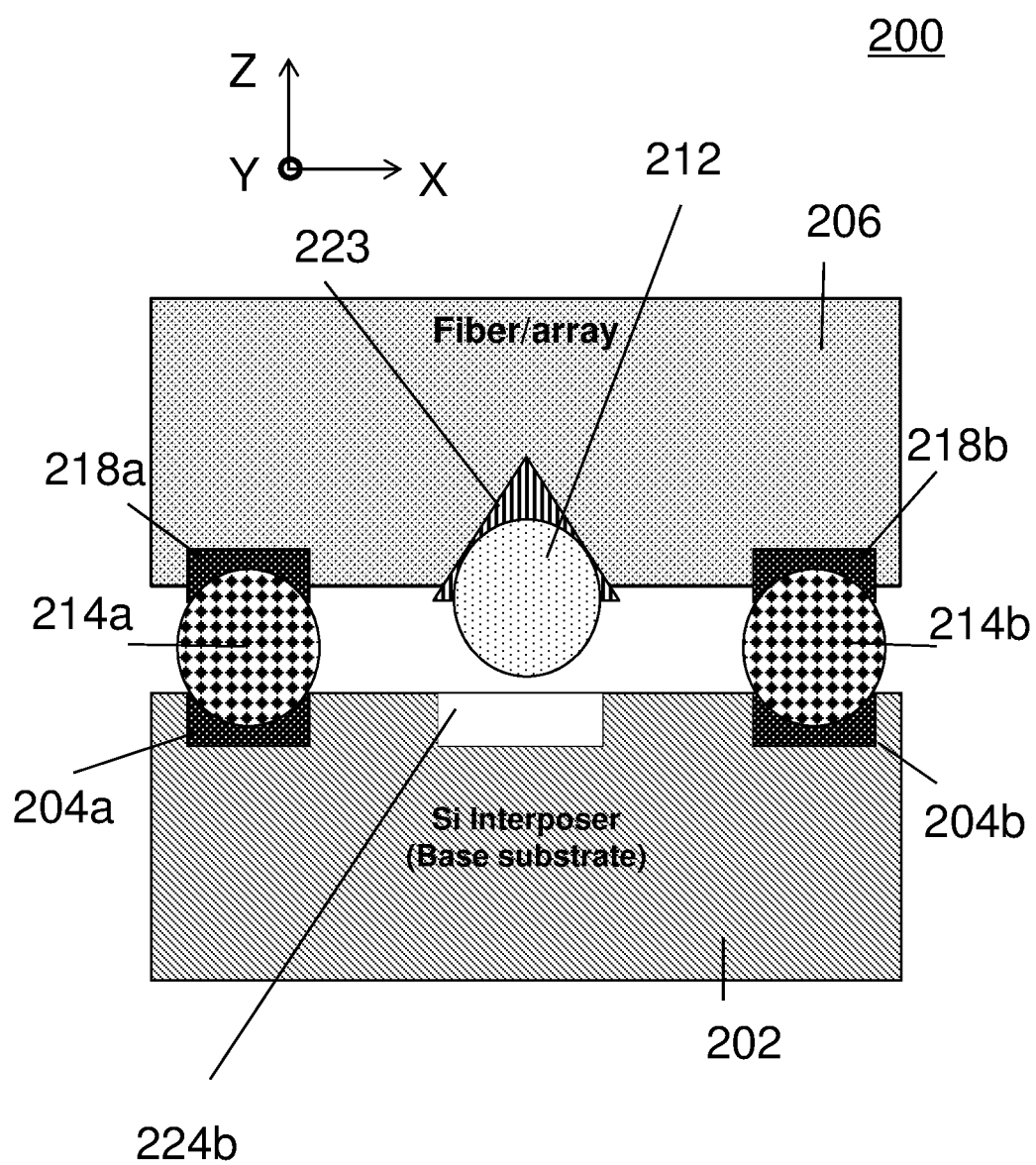
FIG. 2H is a schematic showing a cross-sectional front view of the optical assembly shown in FIG. 2A according to various other embodiments.

FIG. 2H is a schematic showing a cross-sectional front view of the optical assembly 200 shown in FIG. 2A according to various other embodiments. Instead of a through hole 224a, the substrate 202 may include a groove 224b to accommodate the signal fiber 212.

Figure 2I:
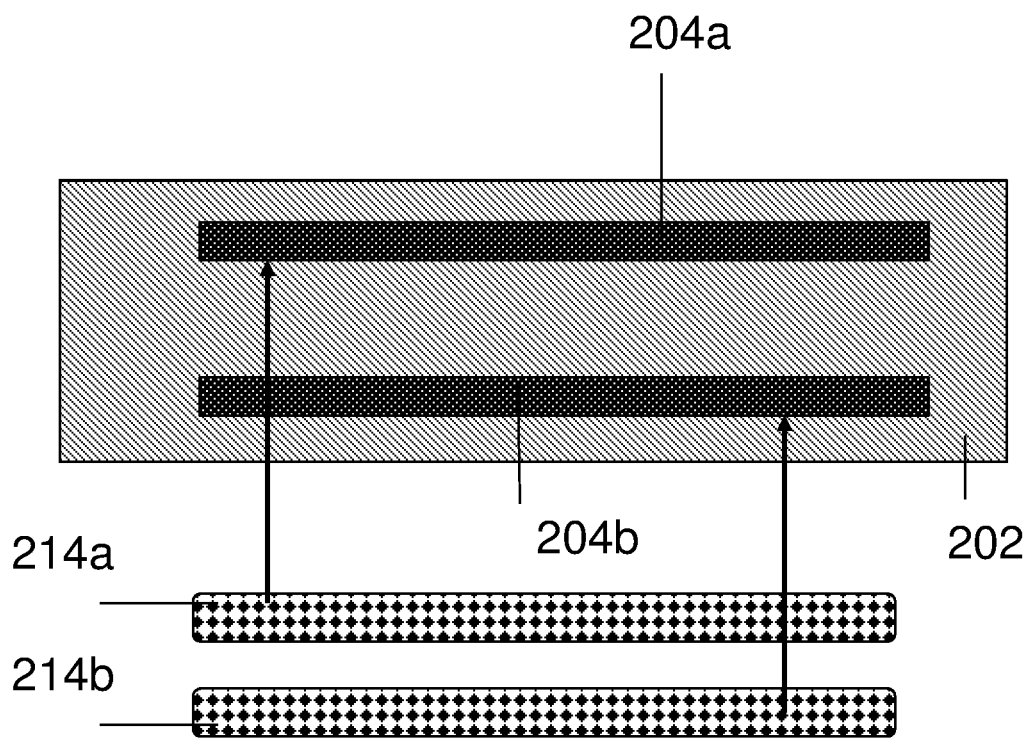
FIG. 2I is a schematic showing a top planar view of the substrate including grooves according to various embodiments.

FIG. 2I is a schematic showing atop planar view of the substrate 202 including grooves 204a, 204b according to various embodiments. Rod 204a may be arranged on groove 204a, and rod 204b may be arranged on groove 204b.

Figure 2J:
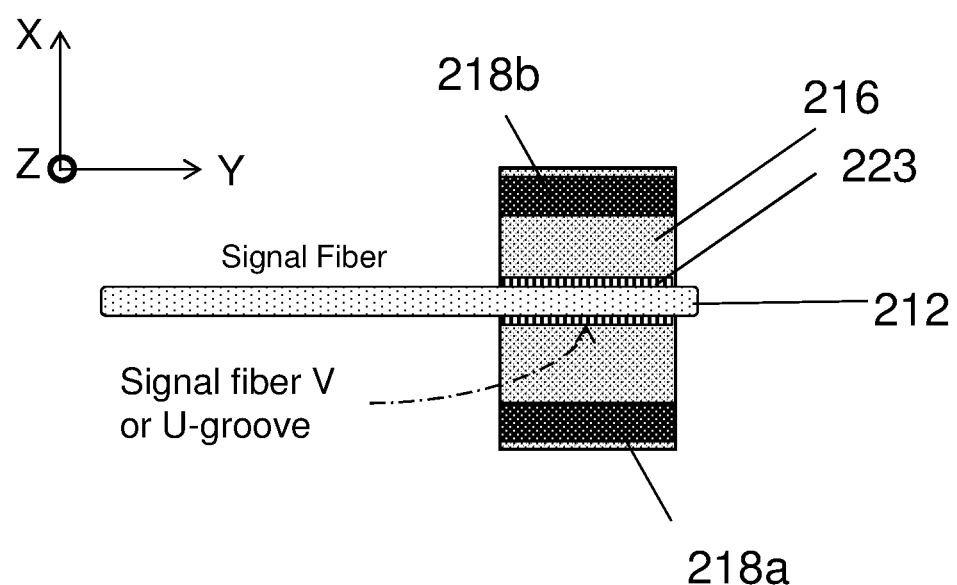
FIG. 2J is a schematic showing a bottom planar view of the fiber block including grooves for holding cylindrical rods according to various embodiments.

FIG. 2J is a schematic showing a bottom planar view of the fiber block 216 including grooves 218a, 218b for holding cylindrical rods 214a-b according to various embodiments. The fiber block 216 may also include a groove for holding the optical fiber 212. It may be envisioned that the groove 223 for holding the fiber 212 may be a U-groove instead of a V-groove as shown in FIG. 2H.

Figure 2K:
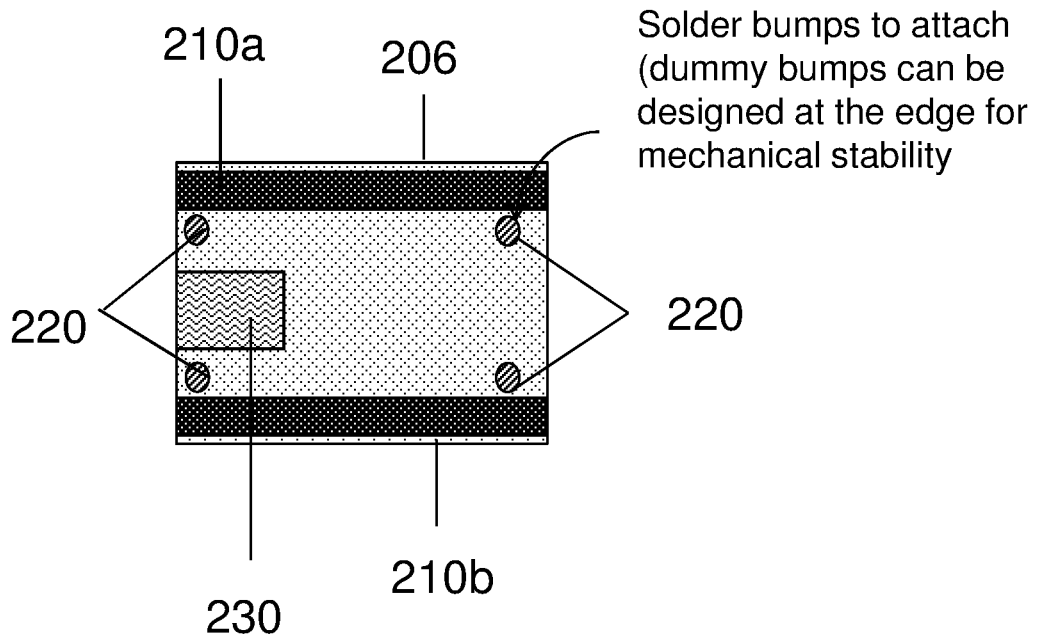
FIG. 2K is a schematic showing a bottom planar view of the photonic integrated circuit according to various embodiments.

FIG. 2K is a schematic showing a bottom planar view of the photonic integrated circuit 206 according to various embodiments. The PIC 206 may include grooves 210a, 210b for holding cylindrical rods 214a-b. In addition, the PIC 206 may include solder bumps 220 for attaching to the substrate 202. Dummy bumps may be designed at the edge to improve mechanical stability. In various embodiments, the PIC may include a coupler 230, such as an adiabatic coupler. The coupler 230 may providing optical coupling between the waveguide 208 and the fiber 212.

In various embodiments, a U-groove or a V-groove may be formed on the substrate for holding the signal fiber. The optical assembly may not include a fiber block for holding the signal fiber.

Figure 3A:
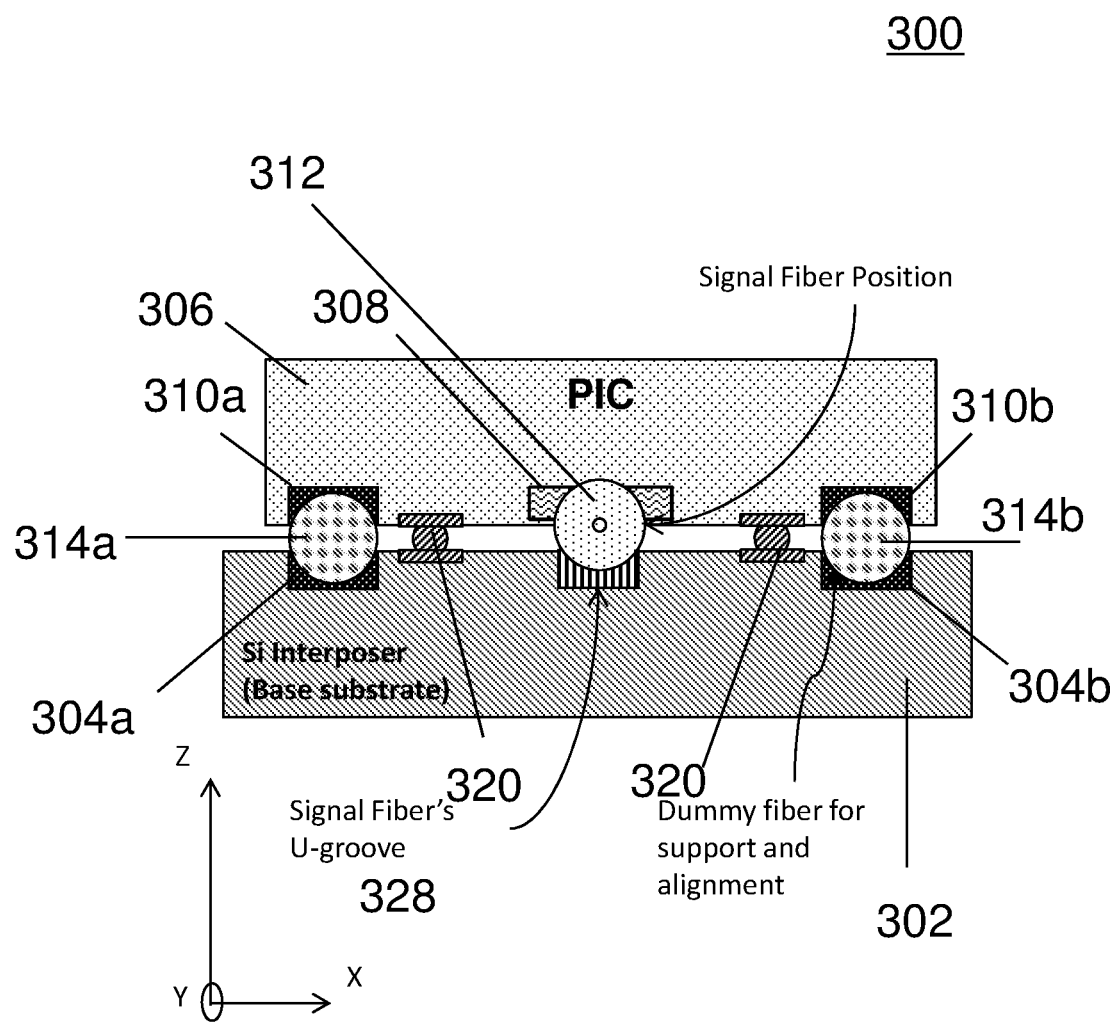
FIG. 3A is a schematic showing a cross-sectional front view of an optical assembly according to various embodiments.

FIG. 3A is a schematic showing a cross-sectional front view of an optical assembly 300 according to various embodiments. FIG. 3B is a schematic showing a cross-sectional side view of the optical assembly 300 according to various embodiments.

The optical assembly 300 may include a substrate 302 with grooves 304a, 304b, and a photonic integrated circuit (PIC) chip 306 with a coupling waveguide 308 and grooves 310a, 310b. The optical assembly 300 may further include a first cylindrical rod 310a with a first portion received in groove 304a, a second portion received in groove 310a, and a third portion between the first portion and the second portion. The optical assembly 300 may further include a second cylindrical rod 310b with a first portion received in groove 304b, a second portion received in groove 310b, and a third portion between the first portion and the second portion. The third portion of the first cylindrical rod 310a and the third portion of the second cylindrical rod 310ab may provide a vertical offset between the photonic integrated circuit (PIC) chip 306 and the substrate 302. The optical fiber or signal fiber 312 may be held in a groove 328, formed on the substrate 302.

The optical assembly 300 may also include one or more electrical connections 320, e.g. solder bumps, connecting one or more electrical interconnects of the substrate 302 and one or more electrical interconnects of the photonic integrated circuit chip 306.

Figure 3C:
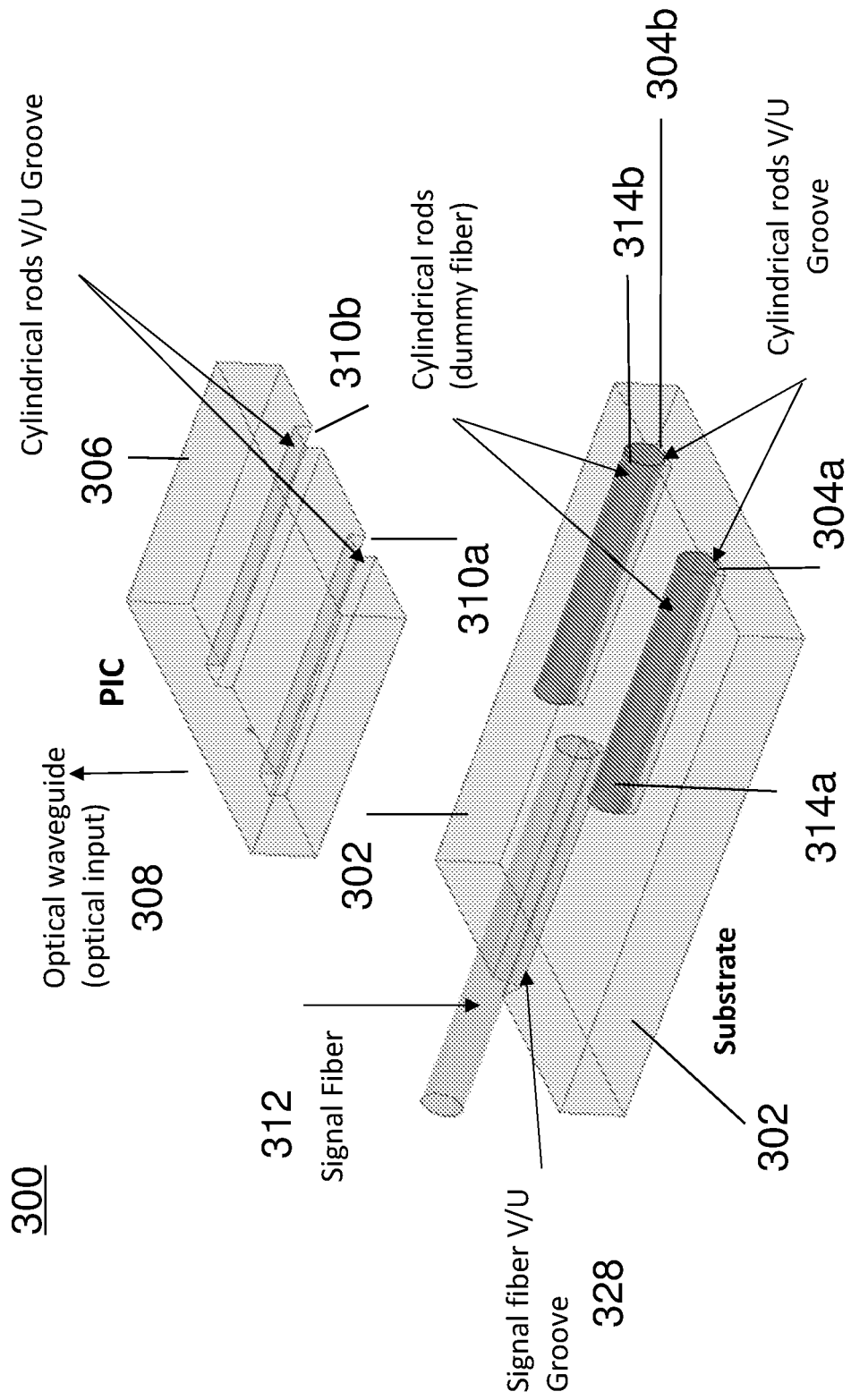
FIG. 3C is a schematic showing a perspective view of the optical assembly according to various embodiments.

FIG. 3C is a schematic showing a perspective view of the optical assembly 300 according to various embodiments. As illustrated in FIG. 3C, the grooves 304a-b, 310a-b, 328 may be U grooves or V grooves.

For PICs that are designed for vertical coupling, usually using grating coupling, an additional similar grating coupler may be designed in the substrate or silicon interposer which may house or hold the optical fiber. The grating in the coupler of the PIC may redirect the horizontal (in plane) light in the waveguide of the PIC to a vertical (out of plane) direction. The grating coupler in the substrate or silicon interposer may be placed directly facing the grating coupler of the PIC, i.e. in a face-to-face manner. The other end of the coupler of the substrate or interposer may be coupled or connected to a further waveguide, which may have a beam mode expander designed on it, and may be aligned to the optical fiber. The optical fiber may be held by the substrate or interposer using a V or U-groove to attain the precise position. Similar to the embodiments employing edge coupling, embodiments employing vertical coupling may also include a set of a dummy support fibers and grooves, e.g. U grooves, on the substrate or interposer and the PIC for precise assembly.

Figure 4:
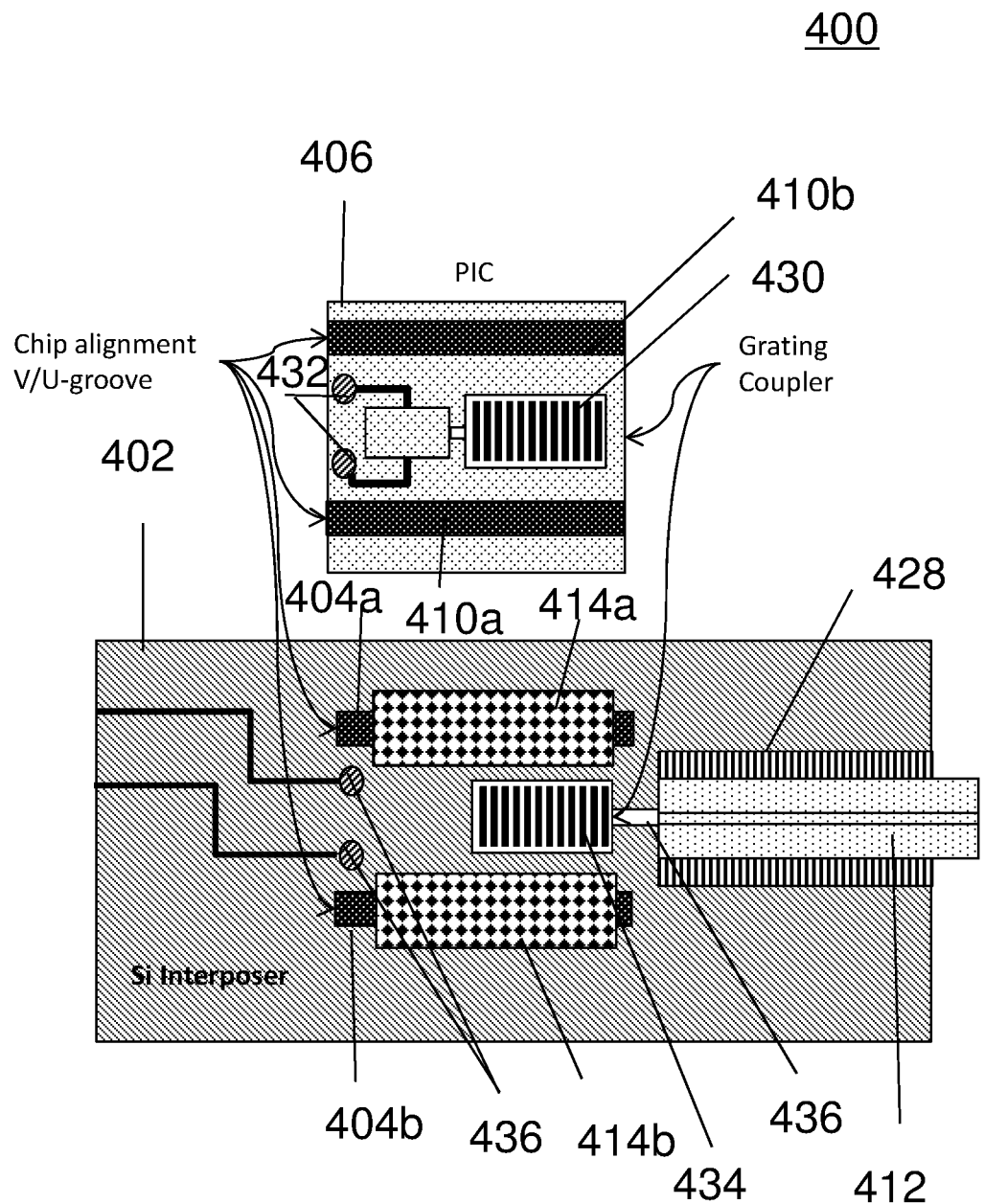
FIG. 4 is a schematic showing a top planar view of a non-fully assembled optical assembly according to various embodiments.

FIG. 4 is a schematic showing a top planar view of a non-fully assembled optical assembly 400 according to various embodiments. The assembly 400 may include a PIC 406 and a substrate 402. FIG. 4 shows the active surface of the PIC 406, i.e. the surface of the PIC 406 facing the substrate 402, as well as the surface of the substrate 402 facing the PIC 406. The PIC 406 may include grooves 410a, 410b, as well as a grating coupler 430. In addition, the PIC 406 may include one or more electrical connections 432. The substrate 402 may include a groove 428 holding a signal fiber 412, grooves 404a, 404b, a grating coupler 434, and a waveguide 436 coupling the grating coupler 434 and the optical fiber 412. In addition, the substrate 402 may include one or more electrical connections 436.

The optical assembly 400 may also include cylindrical rods 414a, 414b. A first portion of the cylindrical rod 414a may be received by the groove 404a, a second portion of the rod 414a may be received by groove 410a, and a third portion between the first portion and the second portion may define the vertical offset. Similarly, a first portion of the cylindrical rod 414b may be received by the groove 404b, a second portion of the rod 414b may be received by groove 410b, and a third portion between the first portion and the second portion may define the vertical offset. The grating coupler 430 may face the grating coupler 434, and light may travel from the grating coupler 430 to the grating coupler 434 and/or from the grating coupler 434 to the grating coupler 430.

The one or more electrical connections 432 may be electrically connected to the one or more electrical connections 436.

For vertical coupling, the positions of the grating couplers in the PICs may not be restricted to be on the edge of the chip. An optical assembly may include multiple couplers for different channels. For such situations, multiple grating couplers on the substrate or silicon interposer may be coupled with multiple couplers of the PIC, and each of the multiple couplers on the substrate or interposer may be coupled or connected to an optical waveguide to an optical fiber. The multiple optical fibers may be at or near the edge of the substrate or interposer.

Figure 5:
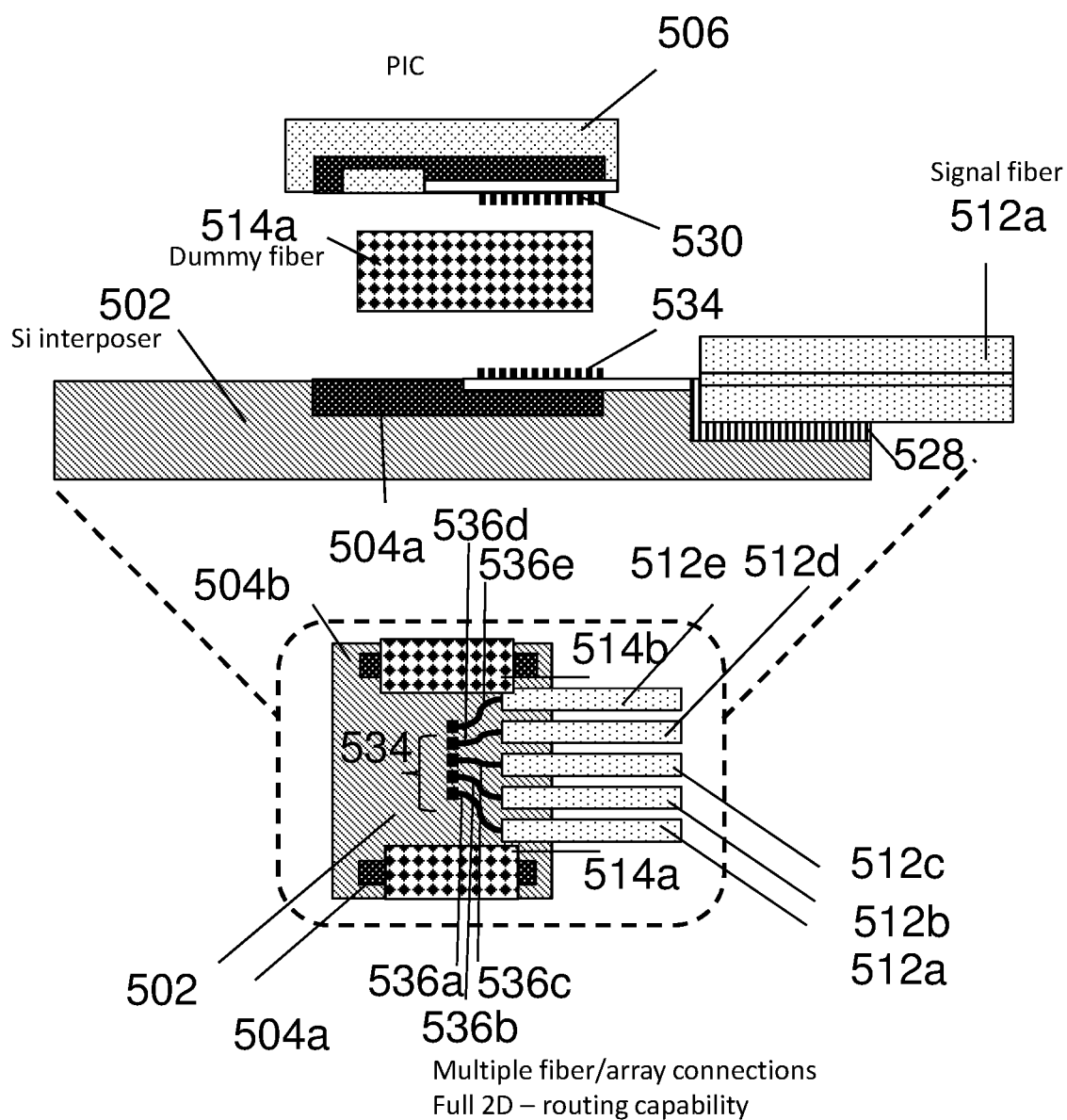
FIG. 5 is a schematic showing a side view of a non-fully assembled optical assembly according to various embodiments, with the inset showing a schematic of a top planar view of the substrate.

FIG. 5 is a schematic showing a side view of a non-fully assembled optical assembly 500 according to various embodiments, with the inset showing a schematic of a top planar view of the substrate 502. The assembly 500 may include the PIC 506 and the substrate 502. The PIC 506 may include grooves 510a, 510b, as well as a plurality of grating couplers 530.

The substrate 502 may include a plurality of grooves 528, each of the plurality of grooves 528 holding signal fibers 512a-e, grooves 504a, 504b, a plurality of grating couplers 534, and a plurality of waveguides 536a-e coupling the grating coupler 534 and the signal fibers 512a-e. In addition, the substrate 502 may include one or more electrical connections 536.

The optical assembly 500 may also include cylindrical rods 514a, 514b. A first portion of the cylindrical rod 514a may be received by the groove 504a, a second portion of the rod 514a may be received by groove 510a, and a third portion between the first portion and the second portion may define the vertical offset. Similarly, a first portion of the cylindrical rod 514b may be received by the groove 504b, a second portion of the rod 514b may be received by groove 510b, and a third portion between the first portion and the second portion may define the vertical offset. The grating couplers 530 may face the grating couplers 534.

For electrical connection, an electronic integrated circuit (EIC) flip chip and the PIC flip chip may be assembled on the substrate or silicon interposer. The electronic integrated circuit (EIC) flip chip and the PIC flip chip may be electrically connected via one or more interconnects or transmission lines on the substrate or interposer. The EIC may be attached or formed at the back of the PIC (the EIC and PIC may be formed on the same side of the substrate or interposer) so that the one or more interconnects or transmission lines may be routed directly and may avoid the U-grooves on the substrate or interposer. A high resistivity silicon substrate may be needed for low loss performance in high frequency operations.

Figure 6:
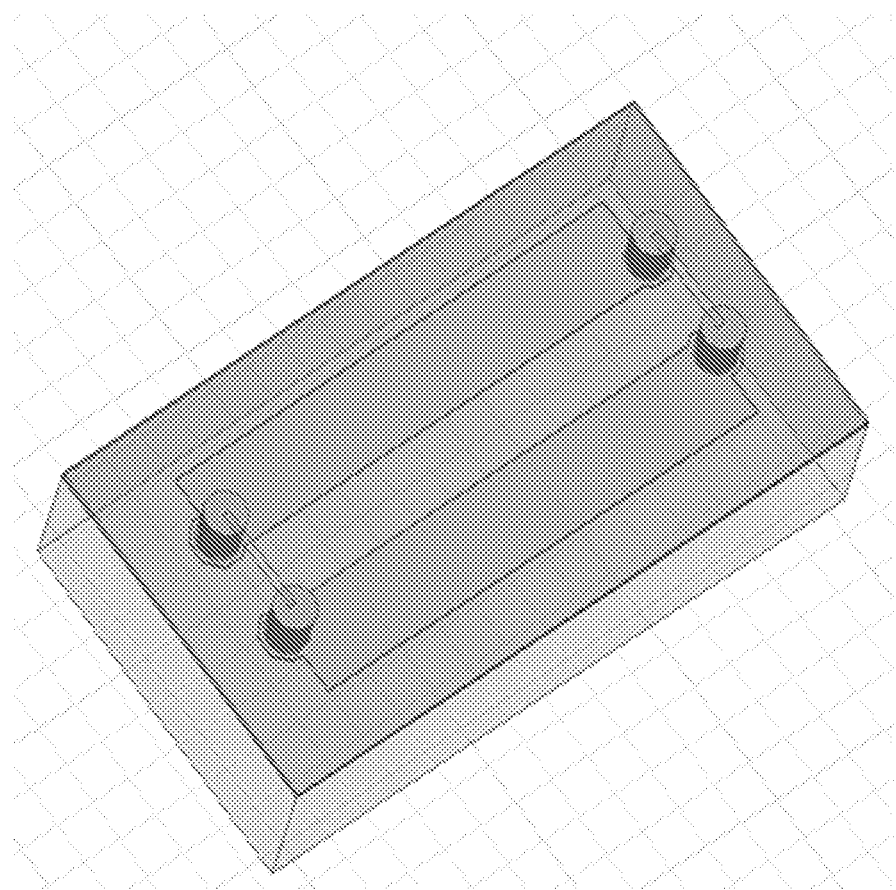
FIG. 6 is a schematic showing a perspective view of 2 pairs of differential micro bumps connected through a differential transmission line on a substrate according to various embodiments.

FIG. 6 is a schematic showing a perspective view of 2 pairs of differential micro bumps connected through a differential transmission line on a substrate according to various embodiments. The substrate may have a high resistivity of 700 Ω·cm. The micro bumps may have a pitch of 125 μm. Each microbump may have the dimensions of a typical integrated circuit input/output (IC I/O) pad. The differential transmission line may have a length of 600 μm, a width of 100 μm, and gap of 80 μm.

Figure 7A:
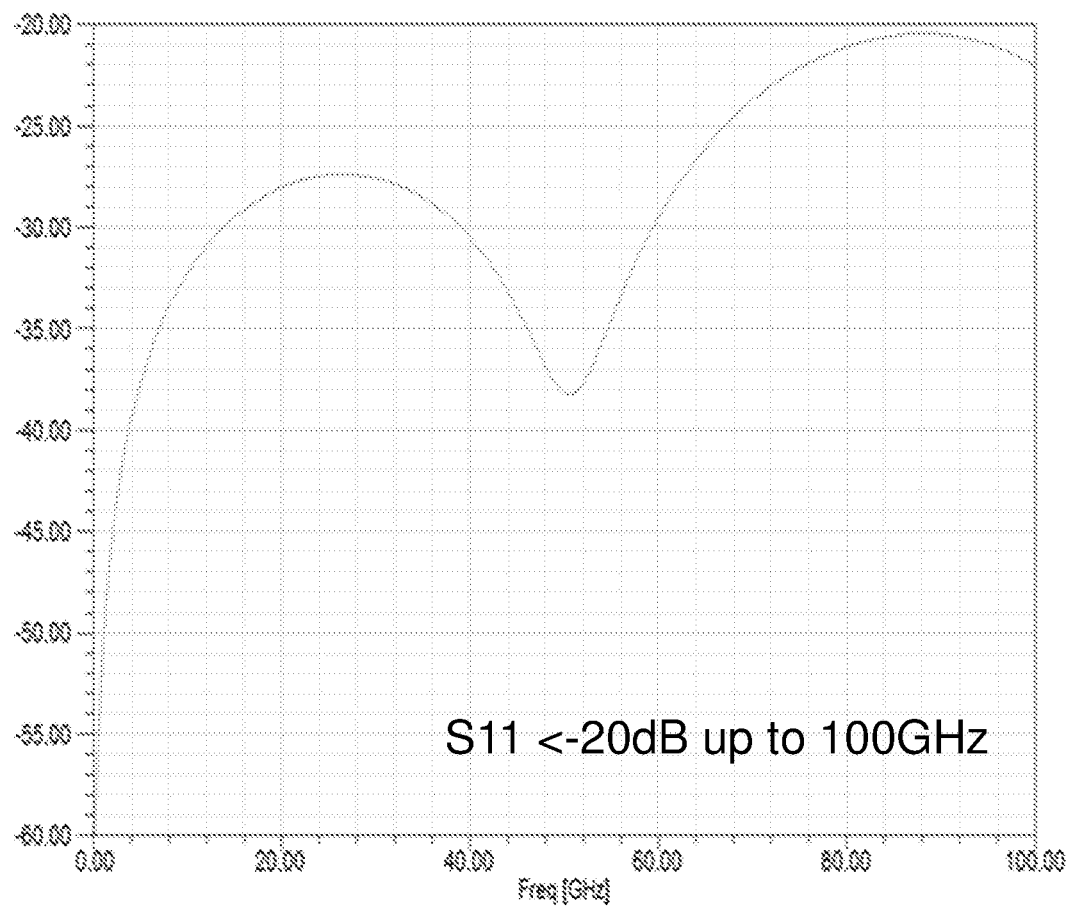
FIG. 7A is a plot of magnitude (in decibels or dB) as a function of frequency (in gigahertz or GHz) showing the simulated response of the return loss (S11) of the transmission line according to various embodiments.
Figure 7B:
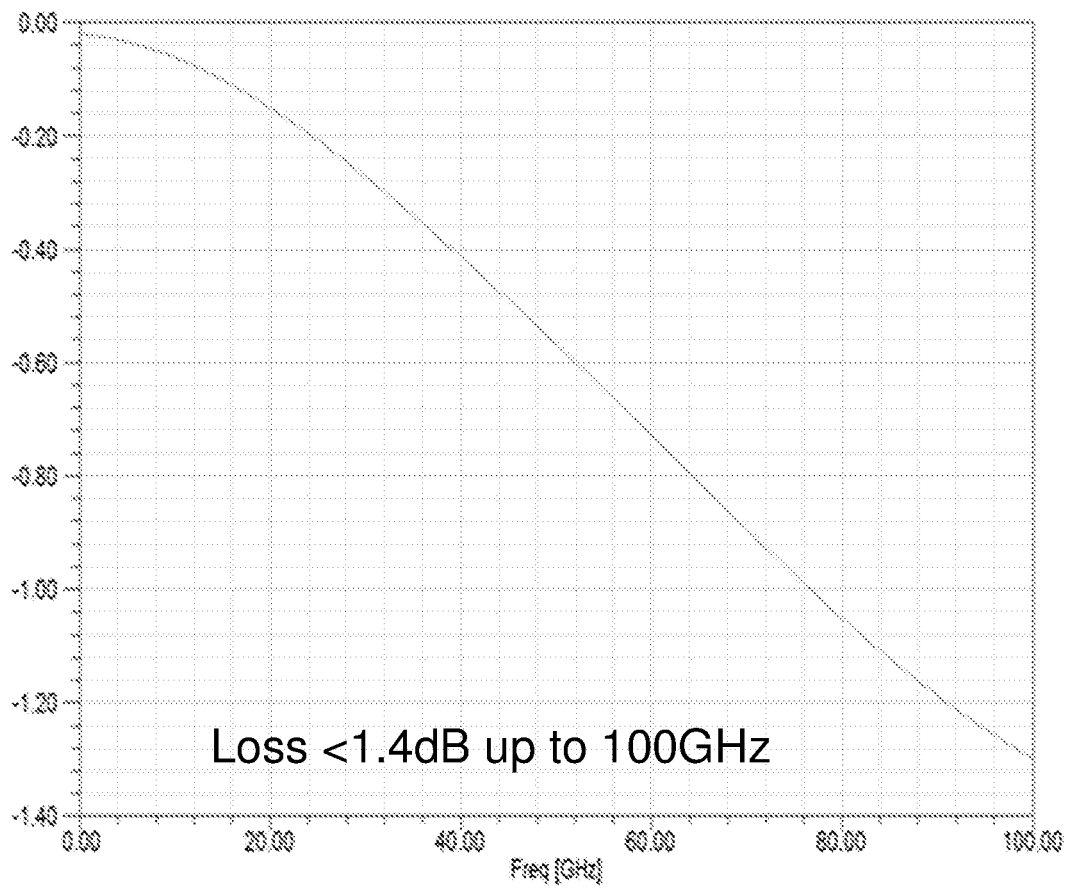
FIG. 7B is a is a plot of magnitude (in decibels or dB) as a function of frequency (in gigahertz or GHz) showing the simulated response of the insert loss (S21) of the transmission line according to various embodiments.

The simulated response of the return loss (S11) and the insert loss (S21) using High Frequency Electromagnetic Field Simulation (HFSS) may be shown in FIGS. 7A-B.

FIG. 7A is a plot of magnitude (in decibels or dB) as a function of frequency (in gigahertz or GHz) showing the simulated response of the return loss (S11) of the transmission line according to various embodiments. FIG. 7B is a is a plot of magnitude (in decibels or dB) as a function of frequency (in gigahertz or GHz) showing the simulated response of the insert loss (S21) of the transmission line according to various embodiments. FIGS. 7A-B may relate to a transmission line with micro bumps having a diameter of 50 μm.

The return loss is less than −20 dB and the insert loss is less than −1.4 dB from 100 MHz to 100 GHz bandwidth. These results showed that the silicon interposer can support over 100 Gbps of connection.

Figure 7C:
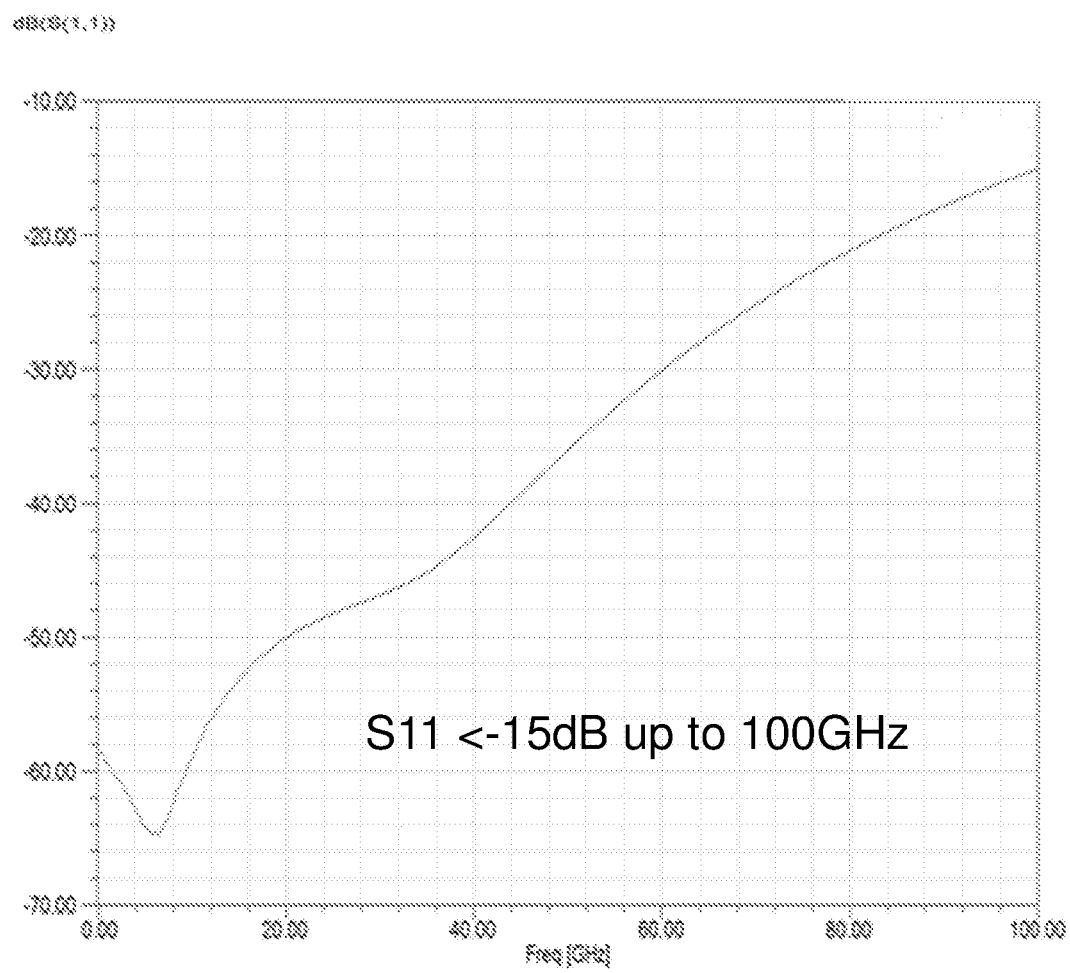
FIG. 7C is a plot of magnitude (in decibels or dB) as a function of frequency (in gigahertz or GHz) showing the simulated response of the return loss (S11) of the transmission line according to various embodiments.
Figure 7D:
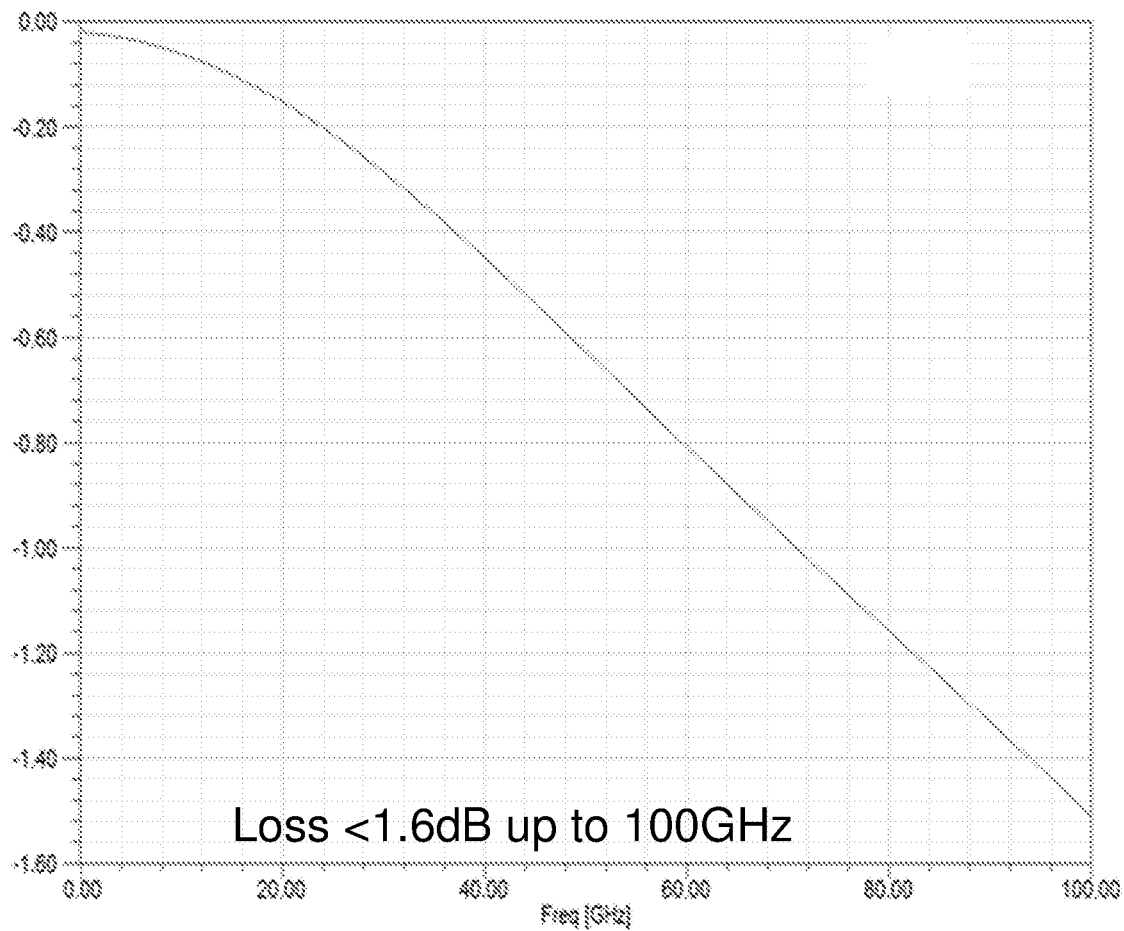
FIG. 7D is a is a plot of magnitude (in decibels or dB) as a function of frequency (in gigahertz or GHz) showing the simulated response of the insert loss (S21) of the transmission line according to various embodiments.

FIG. 7C is a plot of magnitude (in decibels or dB) as a function of frequency (in gigahertz or GHz) showing the simulated response of the return loss (S11) of the transmission line according to various embodiments. FIG. 7D is a is a plot of magnitude (in decibels or dB) as a function of frequency (in gigahertz or GHz) showing the simulated response of the insert loss (S21) of the transmission line according to various embodiments. FIGS. 7C-D may relate to a transmission line with micro bumps having a diameter of 70 μm.

The return loss is less than −15 dB and the insert loss is less than −1.6 dB from 100 MHz to 100 GHz bandwidth. These results showed that the silicon interposer can support over 100 Gbps of connection.

Figure 8:
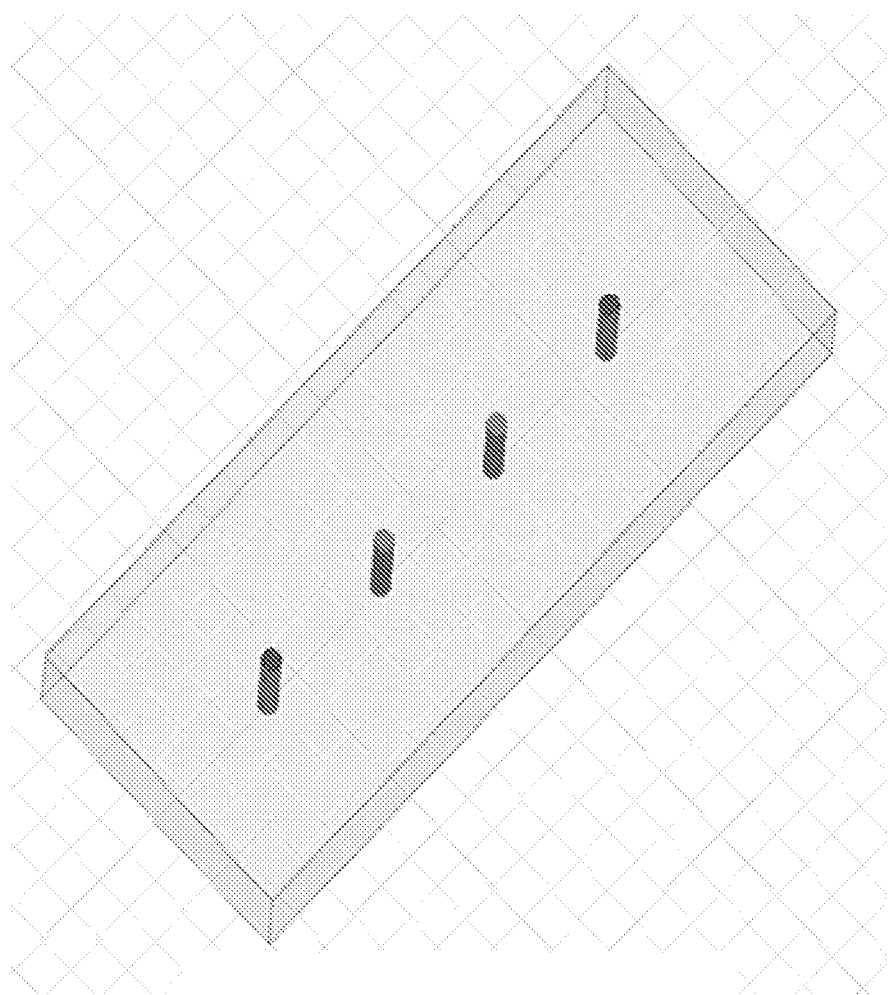
FIG. 8 is a schematic showing through silicon vias in differential pair configuration according to various embodiments.
Figure 8:
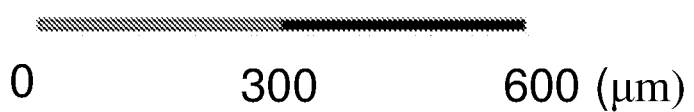

For higher density connections, the electrical signal may be routed through the TSVs of the silicon interposer and may bypass the U-grooves. In this way, the EIC may be located at the side of the PIC or on another substrate. FIG. 8 is a schematic showing through silicon vias in differential pair configuration according to various embodiments.

Figure 9A:
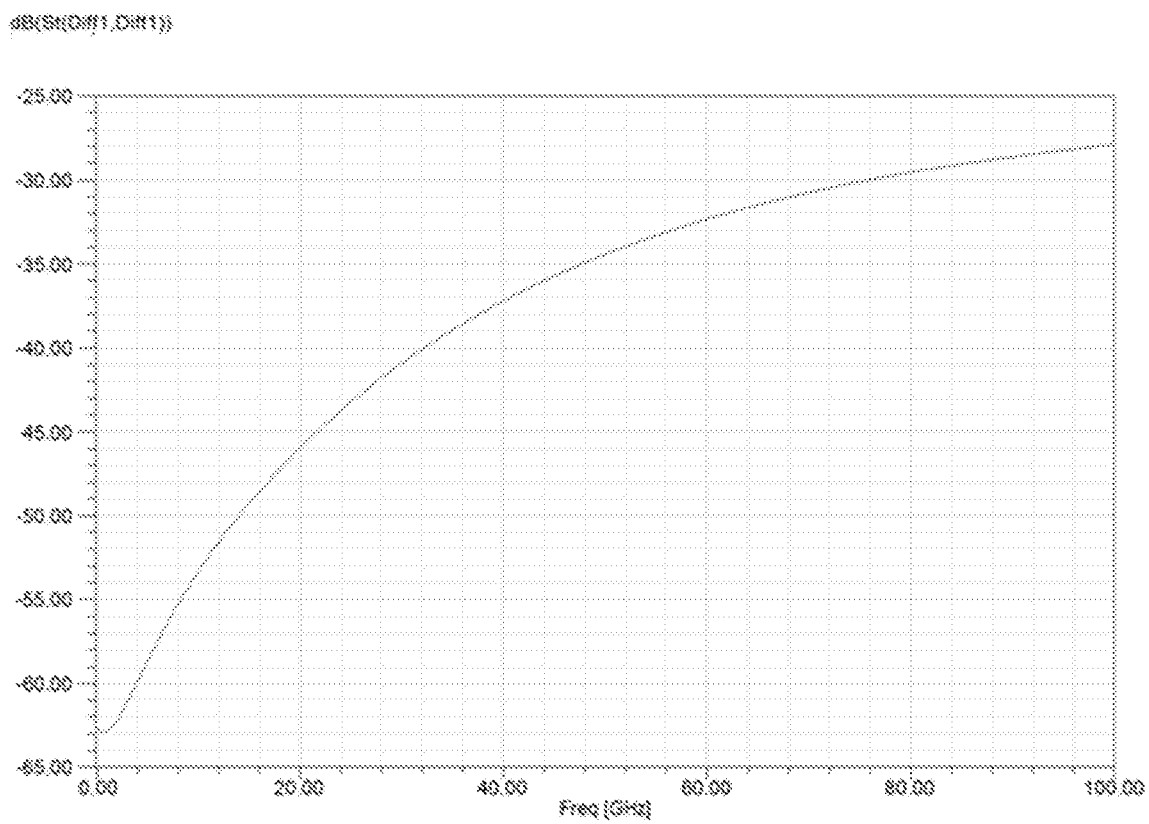
FIG. 9A is a plot of magnitude (in decibels or dB) as a function of frequency (in gigahertz or GHz) showing the simulated response of the return loss (S11) of the through silicon vias (TSVs) according to various embodiments.
Figure 9B:
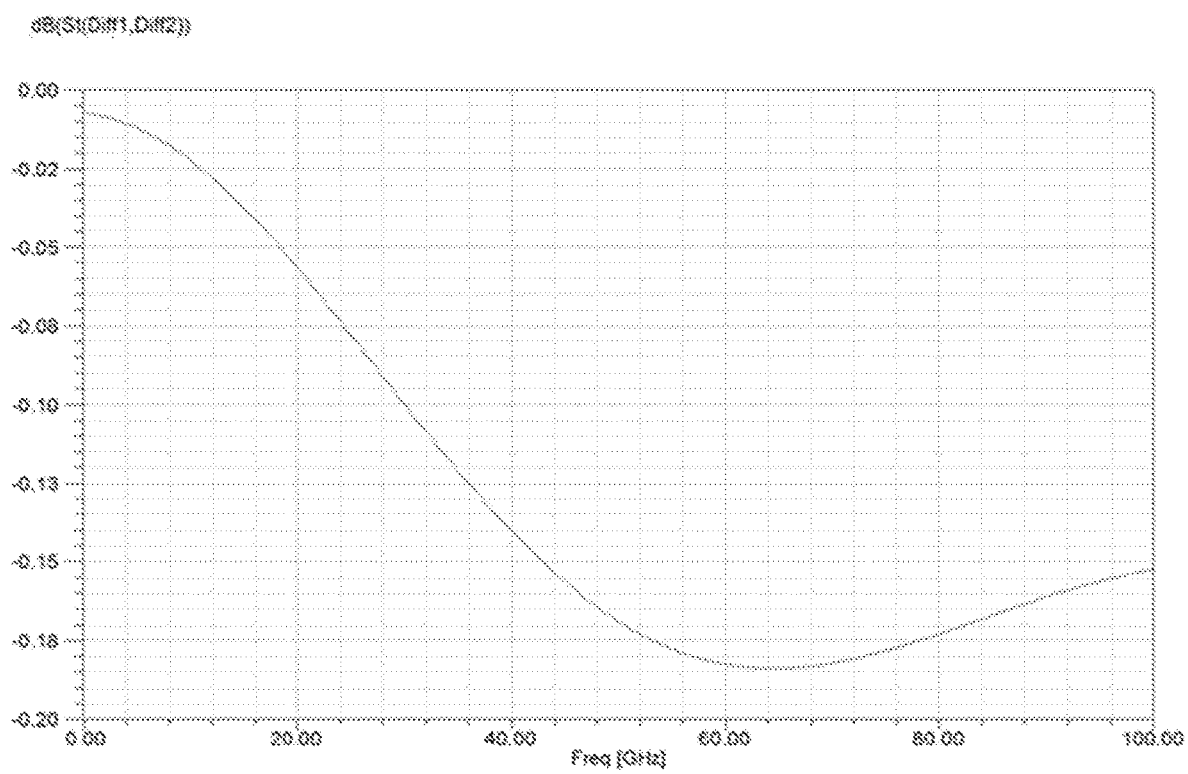
FIG. 9B is a plot of magnitude (in decibels or dB) as a function of frequency (in gigahertz or GHz) showing the simulated response of the insert loss (S21) of the through silicon vias (TSVs) according to various embodiments.

The S11 and S21 simulated response of the TSVs are shown in FIGS. 9A-B.

FIG. 9A is a plot of magnitude (in decibels or dB) as a function of frequency (in gigahertz or GHz) showing the simulated response of the return loss (S11) of the through silicon vias (TSVs) according to various embodiments. FIG. 9B is a plot of magnitude (in decibels or dB) as a function of frequency (in gigahertz or GHz) showing the simulated response of the insert loss (S21) of the through silicon vias (TSVs) according to various embodiments.

The return loss is less than −25 dB while the maximum insert loss is less than 0.2 dB for the same frequency range. These results also showed that TSVs on the silicon interposer may support over 100 Gbps of connection.

Figure 10:
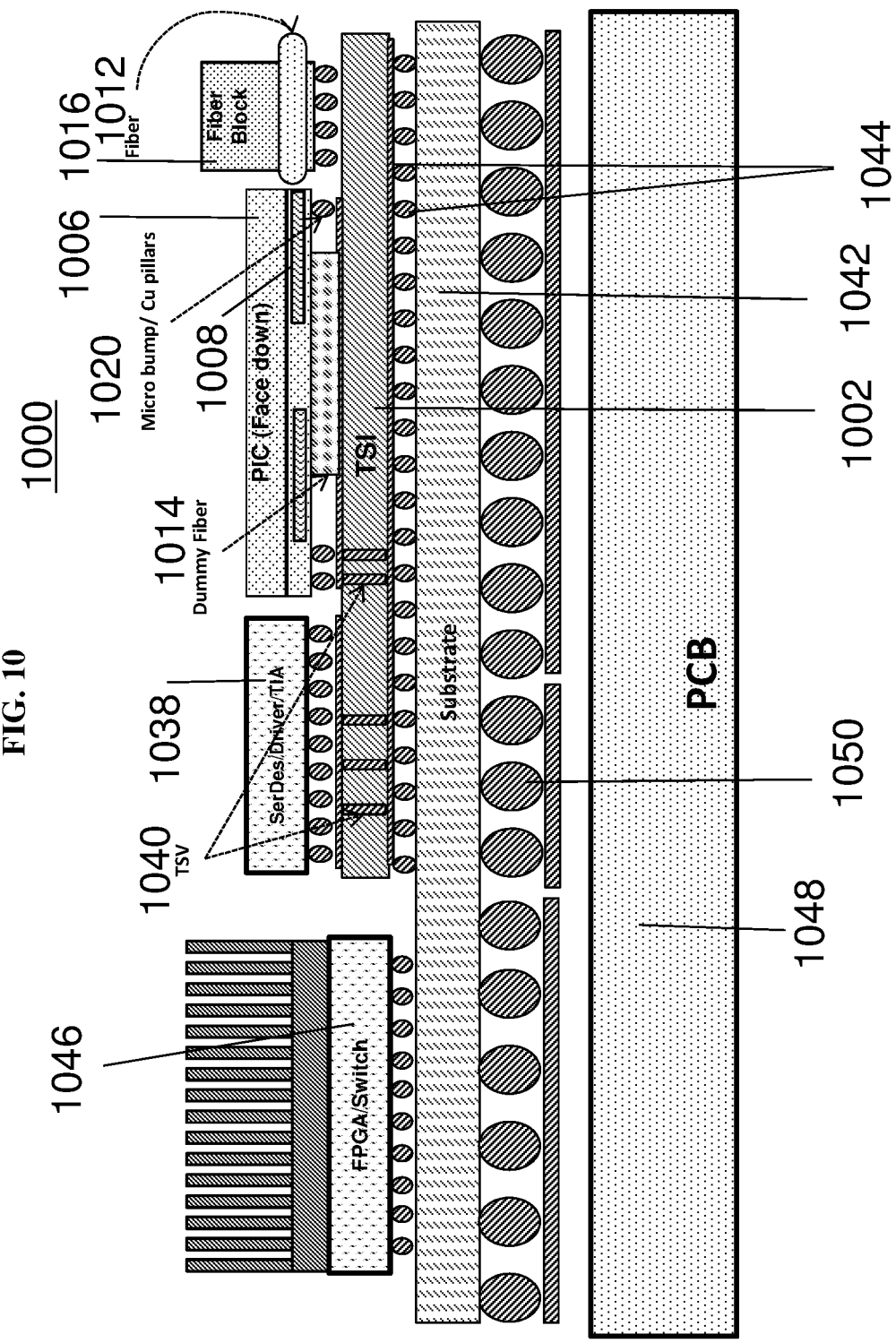
FIG. 10 shows a schematic of a cross-sectional side view of an optical assembly according to various embodiments.

FIG. 10 shows a schematic of a cross-sectional side view of an optical assembly 1000 according to various embodiments.

The optical assembly 1000 may include a through silicon interposer (TSI) 1002 as a first substrate.

The through silicon interposer 1002 may include a first groove on a surface of the TSI 1002, the first groove having a first lateral surface, a second lateral surface, and a base joining the first lateral surface and the second lateral surface. The through silicon interposer 1002 may also include a second groove on the surface of the TSI 1002 and parallel to the first groove of the TSI 1002, the second groove having a first lateral surface, a second lateral surface, and a base joining the first lateral surface and the second lateral surface.

The optical assembly 1000 may further include a photonic integrated circuit chip (PIC) 1006 over or above the TSI 1002 with a surface, e.g. the active surface, of the photonic integrated circuit chip 1006 facing the surface of the TSI 1002.

The photonic integrated circuit chip 1006 may include a coupling waveguide 1008. The photonic integrated circuit chip 1006 may also include a first groove on the surface of the photonic integrated circuit chip 1006, the first groove having a first lateral surface, a second lateral surface, and a base joining the first lateral surface and the second lateral surface. The photonic integrated circuit chip 1006 may additionally include a second groove on the surface of the photonic integrated circuit chip 1006 and parallel to the first groove of the photonic integrated circuit chip 1006, the second groove having a first lateral surface, a second lateral surface, and a base joining the first lateral surface and the second lateral surface.

The optical assembly 1000 may also include an optical fiber 1012 over or above the TSI 1002 and lateral to the photonic integrated circuit chip 1006. The optical assembly 1000 may further include a first cylindrical rod 1014, e.g. a dummy fiber, having a first portion received by the first groove of the TSI 1002 and spaced from the base of the first groove of the TSI 1002, a second portion received by the first groove of the photonic integrated circuit chip 1006 and spaced from the base of the first groove of the photonic integrated circuit chip 1006, and a third portion between the first portion and the second portion (of the first cylindrical rod 1014).

The optical assembly 1000 may additionally include a second cylindrical rod (not shown in FIG. 10) having a first portion received by the second groove of the TSI 1002 and spaced from the base of the second groove of the TSI 1002, a second portion received by the second groove of the photonic integrated circuit chip 1006, and a third portion between the first portion and the second portion (of the second cylindrical rod).

The third portion of the first cylindrical rod 1014 and the third portion of the second cylindrical rod may define a (desired) vertical offset between the photonic integrated circuit chip 1006 and the TSI 1002 to align the coupling waveguide 1008 with the optical fiber 1012.

The optical assembly 1000 may further include a fiber block 1016 above the TSI 1002 and lateral to the photonic integrated circuit chip 1006. The optical fiber 1012 may be coupled to the fiber block 1016. The fiber block 1016 may be bonded to the TSI 1002 by interconnects 1020 such as micro bumps or copper pillars. The PIC 1006 may also be bonded to the TSI 1002 by interconnects 1020 such as micro bumps or copper pillars.

The optical assembly 1000 may also include a electronic integrated circuit (EIC) chip 1038 such as a Serializer/Deserializer (SerDes), a driver, or a transimpedance amplifier (TIA) over or above the TSI 1002. The EIC chip 1038 may also be bonded to the TSI 1002. The TSI 1002 may include one or more through silicon vias (TSVs) 1040. The TSI 1002 may be bonded to a second substrate 1042 using further interconnects 1044 such as micro bumps or copper pillars.

The optical assembly 1000 may also include a further chip 1046 such as a field-programmable gate array (FPGA) or a switching chip bonded to the second substrate 1042 using further interconnects 1044. The second substrate 1042 may be bonded to a printed circuit board (PCB) 1048 via solder bumps 1050. The PIC 1006, the EIC chip 1038, and may be in electrical connection with the TSVs 1040 of TSI 1002 via interconnects 1020. The second substrate 1042 may also include one or more interconnects in electrical connection with the TSVs 1040 via further interconnects 1044. The further chip 1046 may also be in electrical connection with the one or more interconnects in the substrate 1042 via further interconnects 1044. The one or more interconnects in the substrate 1042 may in turn be in electrical connection with metallization on the PCB 1048 via solder bumps 1050. The optical assembly 1000 may be a Electronic Photonics Integrated Circuit (EPIC) silicon (Si) interposer Optical Transceiver.

Figure 11:
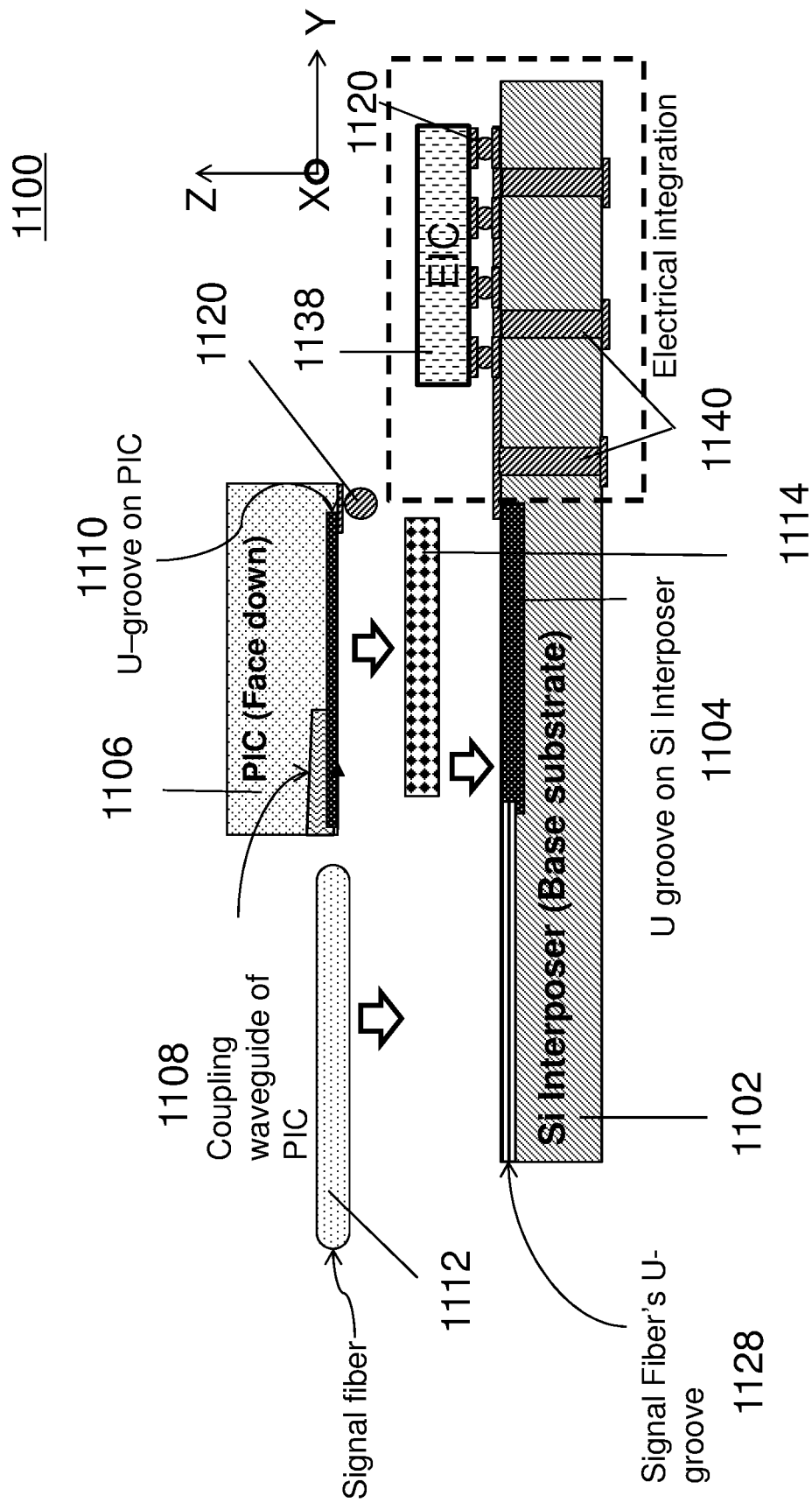
FIG. 11 shows a schematic of a cross-sectional side view of a non-fully assembled optical assembly according to various embodiments.

FIG. 11 shows a schematic of a cross-sectional side view of a non-fully assembled optical assembly 1100 according to various embodiments.

The optical assembly 1100 may include a substrate or silicon interposer 1102.

The substrate or silicon interposer 1102 may include a first groove 1104 on a surface of the substrate or silicon interposer 1102, the first groove having a first lateral surface, a second lateral surface, and a base joining the first lateral surface and the second lateral surface. The substrate or silicon interposer 1102 may also include a second groove (not shown) on the surface of the substrate or silicon interposer 1102 and parallel to the first groove of the substrate or silicon interposer 1102, the second groove having a first lateral surface, a second lateral surface, and a base joining the first lateral surface and the second lateral surface.

The optical assembly 1100 may further include a photonic integrated circuit chip (PIC) 1106 over or above the substrate or silicon interposer 1102 with a surface, e.g. the active surface, of the photonic integrated circuit chip 1106 facing the surface of the substrate or silicon interposer 1102.

The photonic integrated circuit chip 1106 may include a coupling waveguide 1108. The photonic integrated circuit chip 1106 may also include a first groove 1110 on the surface of the photonic integrated circuit chip 1106, the first groove having a first lateral surface, a second lateral surface, and a base joining the first lateral surface and the second lateral surface. The photonic integrated circuit chip 1106 may additionally include a second groove (not shown) on the surface of the photonic integrated circuit chip 1106 and parallel to the first groove of the photonic integrated circuit chip 1106, the second groove having a first lateral surface, a second lateral surface, and a base joining the first lateral surface and the second lateral surface.

The optical assembly 1100 may also include an optical fiber 1112 over or above the substrate or silicon interposer 1102 and lateral to the photonic integrated circuit chip 1106. The optical assembly 1100 may further include a first cylindrical rod 1114, e.g. a dummy fiber, having a first portion received by the first groove 1104 of the substrate or silicon interposer 1102 and spaced from the base of the first groove 1104 of the substrate or silicon interposer 1102, a second portion received by the first groove 1110 of the photonic integrated circuit chip 1106 and spaced from the base of the first groove 1110 of the photonic integrated circuit chip 1106, and a third portion between the first portion and the second portion (of the first cylindrical rod 1114).

The optical assembly 1100 may additionally include a second cylindrical rod (not shown in FIG. 11) having a first portion received by the second groove of the substrate or silicon interposer 1102 and spaced from the base of the second groove of the substrate or silicon interposer 1102, a second portion received by the second groove of the photonic integrated circuit chip 1106, and a third portion between the first portion and the second portion (of the second cylindrical rod).

The third portion of the first cylindrical rod 1114 and the third portion of the second cylindrical rod may define a (desired) vertical offset between the photonic integrated circuit chip 1106 and the substrate or silicon interposer 1102 to align the coupling waveguide 1108 with the optical fiber 1112.

The photonic integrated circuit chip 1106 may be attached or bonded to the substrate or silicon interposer 1102 by one or more interconnects 1120.

The substrate or silicon interposer 1102 may include a groove 1128, e.g. a U-groove, configured to hold the optical fiber 1112.

The optical assembly 1100 may further include an electronic integrated circuit (EIC) chip 1138. The electronic integrated circuit (EIC) chip 1138 may be bonded or attached to the substrate or silicon interposer 1102 by one or more interconnects 1120.

The substrate or silicon interposer 1102 may further include one or more through silicon vias (TSVs) 1140. The one or more through silicon vias (TSVs) 1140 may be in electrical connection with the EIC chip 1138 via the one or more interconnects 1120.

Figure 12:
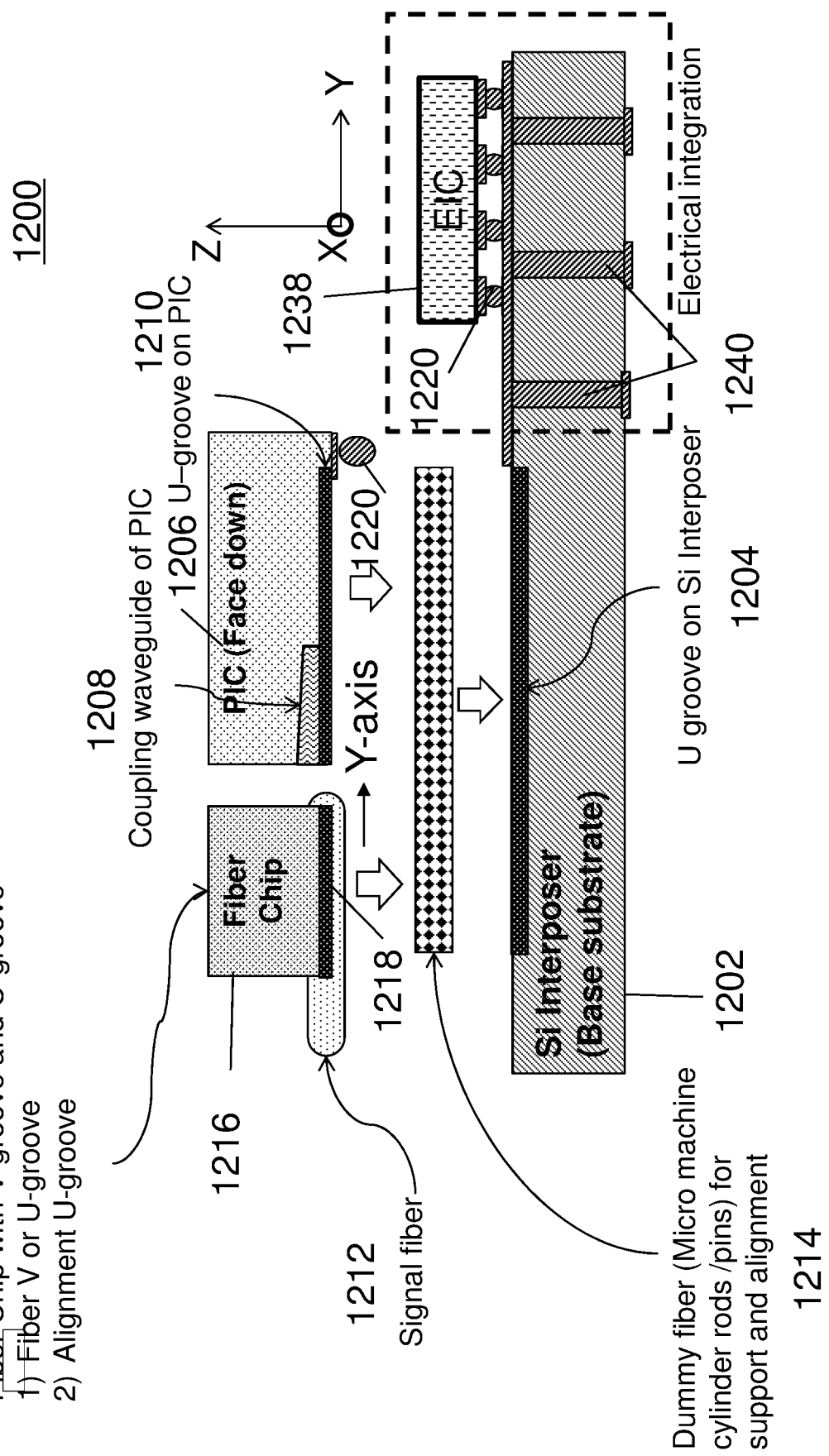
FIG. 12 shows a schematic of a cross-sectional side view of a non-fully assembled optical assembly according to various embodiments.

FIG. 12 shows a schematic of a cross-sectional side view of a non-fully assembled optical assembly 1200 according to various embodiments.

The optical assembly 1200 may include a substrate or silicon interposer 1202.

The substrate or silicon interposer 1202 may include a first groove 1204 on a surface of the substrate or silicon interposer 1202, the first groove having a first lateral surface, a second lateral surface, and a base joining the first lateral surface and the second lateral surface. The substrate or silicon interposer 1202 may also include a second groove (not shown) on the surface of the substrate or silicon interposer 1202 and parallel to the first groove of the substrate or silicon interposer 1202, the second groove having a first lateral surface, a second lateral surface, and a base joining the first lateral surface and the second lateral surface.

The optical assembly 1200 may further include a photonic integrated circuit chip (PIC) 1206 over or above the substrate or silicon interposer 1202 with a surface, e.g. the active surface, of the photonic integrated circuit chip 1206 facing the surface of the substrate or silicon interposer 1202.

The photonic integrated circuit chip 1206 may include a coupling waveguide 1208. The photonic integrated circuit chip 1206 may also include a first groove 1210 on the surface of the photonic integrated circuit chip 1206, the first groove having a first lateral surface, a second lateral surface, and a base joining the first lateral surface and the second lateral surface. The photonic integrated circuit chip 1206 may additionally include a second groove (not shown) on the surface of the photonic integrated circuit chip 1206 and parallel to the first groove of the photonic integrated circuit chip 1206, the second groove having a first lateral surface, a second lateral surface, and a base joining the first lateral surface and the second lateral surface.

The optical assembly 1200 may also include an optical fiber 1212 over or above the substrate or silicon interposer 1202 and lateral to the photonic integrated circuit chip 1206. The optical assembly 1200 may further include a first cylindrical rod 1214, e.g. a dummy fiber, having a first portion received by the first groove 1204 of the substrate or silicon interposer 1202 and spaced from the base of the first groove 1204 of the substrate or silicon interposer 1202, a second portion received by the first groove 1210 of the photonic integrated circuit chip 1206 and spaced from the base of the first groove 1210 of the photonic integrated circuit chip 1206, and a third portion between the first portion and the second portion (of the first cylindrical rod 1214).

The optical assembly 1200 may additionally include a second cylindrical rod (not shown in FIG. 12) having a first portion received by the second groove of the substrate or silicon interposer 1202 and spaced from the base of the second groove of the substrate or silicon interposer 1202, a second portion received by the second groove of the photonic integrated circuit chip 1206, and a third portion between the first portion and the second portion (of the second cylindrical rod).

The third portion of the first cylindrical rod 1214 and the third portion of the second cylindrical rod may define a (desired) vertical offset between the photonic integrated circuit chip 1206 and the substrate or silicon interposer 1202 to align the coupling waveguide 1208 with the optical fiber 1212.

The photonic integrated circuit chip 1206 may be attached or bonded to the substrate or silicon interposer 1202 by one or more interconnects 1220.

The optical assembly 1200 may further include a fiber block 1216 over or above the substrate or silicon interposer 1202 and lateral to the photonic integrated circuit chip 1206. The optical fiber 1212 may be coupled or attached to the fiber block 1216.

The fiber block 1216 may include a first groove 1218, the first groove having a first lateral surface, a second lateral surface, and a base joining the first lateral surface and the second lateral surface. The fiber block 1216 may also include a second groove (not shown in FIG. 12A) parallel to the first groove, the second groove having a first lateral surface, a second lateral surface, and a base joining the first lateral surface and the second lateral surface.

The first groove 1218 of the fiber block 1216 may also receive the second portion of the first cylindrical rod 1214, while the second groove of the fiber block 1216 may also receive the second portion of the second cylindrical rod. The first groove 1218 and the second groove of the fiber block 1216 may be U-grooves. The fiber block 1216 may also include a groove, e.g. a U-groove or a V-groove to hold the optical fiber 1212.

The optical assembly 1200 may further include an electronic integrated circuit (EIC) chip 1238. The electronic integrated circuit (EIC) chip 1238 may be bonded or attached to the substrate or silicon interposer 1202 by one or more interconnects 1220.

The substrate or silicon interposer 1202 may further include one or more through silicon vias (TSVs) 1240. The one or more through silicon vias (TSVs) 1240 may be in electrical connection with the EIC chip 1238 via the one or more interconnects 1220.

Figure 13:
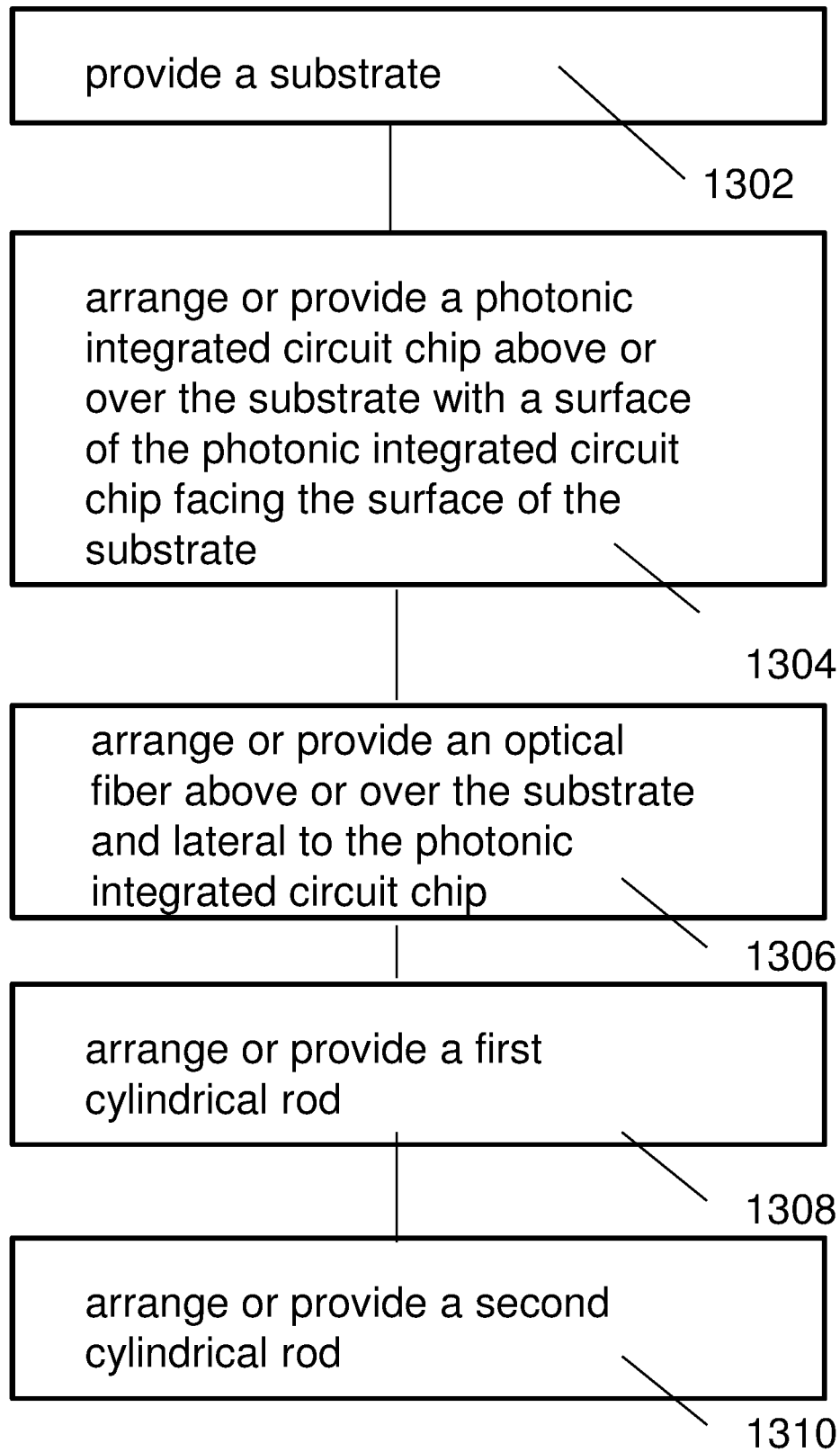
FIG. 13 is a schematic showing a method of forming an optical assembly according to various embodiments.

FIG. 13 is a schematic showing a method of forming an optical assembly according to various embodiments. The method may include, in 1302, providing a substrate. The substrate may include a first groove on a surface of the substrate, the first groove having a first lateral surface, a second lateral surface, and a base joining the first lateral surface and the second lateral surface. The substrate may also include a second groove on the surface of the substrate and parallel to the first groove of the substrate, the second groove having a first lateral surface, a second lateral surface, and a base joining the first lateral surface and the second lateral surface.

The method may further include, in 1304, arranging or providing a photonic integrated circuit chip above or over the substrate with a surface of the photonic integrated circuit chip facing the surface of the substrate. The photonic integrated circuit chip may include a coupling waveguide. The photonic integrated circuit chip may further include a first groove on the surface of the photonic integrated circuit chip, the first groove having a first lateral surface, a second lateral surface, and a base joining the first lateral surface and the second lateral surface. The photonic integrated circuit chip may additionally include a second groove on the surface of the photonic integrated circuit chip and parallel to the first groove of the photonic integrated circuit chip, the second groove having a first lateral surface, a second lateral surface, and a base joining the first lateral surface and the second lateral surface.

The method may also include, in 1306, arranging or providing an optical fiber above or over the substrate and lateral to the photonic integrated circuit chip.

The method may additionally include, in 1308, arranging or providing a first cylindrical rod so that the first cylindrical rod has a first portion received by the first groove of the substrate and spaced from the base of the first groove of the substrate, a second portion received by the first groove of the photonic integrated circuit chip and spaced from the base of the first groove of the photonic integrated circuit chip, and a third portion between the first portion and the second portion.

The method may further include, in 1310, arranging or providing a second cylindrical rod so that the second cylindrical rod has a first portion received by the second groove of the substrate and spaced from the base of the second groove of the substrate, a second portion received by the second groove of the photonic integrated circuit chip, and a third portion between the first portion and the second portion.

The third portion of the first cylindrical rod and the third portion of the second cylindrical rod may define a desired vertical offset between the photonic integrated circuit chip and the substrate to align the coupling waveguide with the optical fiber.

Various embodiments may provide a method of forming an optical assembly as described herein.

In various embodiments, the method may include forming the first groove and the second groove on the substrate, e.g. via etching. The method may also include forming the first groove and the second groove on the photonic integrated circuit chip, e.g. via etching.

In various embodiments, the method may also include arranging or providing one or more further optical fibers above or over the substrate and lateral to the photonic integrated circuit chip. The substrate may include one or more further grating couplers, each of the one or more grating couplers optically coupled to a respective further optical fiber of the one or more further optical fibers.

In various embodiments, the method may additionally include providing, forming or arranging a fiber block above or over the substrate and lateral to the photonic integrated circuit chip. The optical fiber may be coupled or attached to the fiber block. The one or more further optical fibers may also be coupled or attached to the fiber block.

In various embodiments, the substrate may include a third groove on the surface of the substrate, the third groove having a first lateral surface, a second lateral surface, and a base joining the first lateral surface and the second lateral surface. The substrate may also include a fourth groove on the surface of the substrate and parallel to the third groove of the substrate, the fourth groove having a first lateral surface, a second lateral surface, and a base joining the first lateral surface and the second lateral surface.

The method may further include arranging or providing a third cylindrical rod having a first portion received by the third groove of the substrate and spaced from the base of the third groove of the substrate, a second portion received by the first groove of the fiber block and spaced from the base of the first groove of the fiber block, and a third portion between the first portion and the second portion.

The method may also include arranging or providing a fourth cylindrical rod having a first portion received by the fourth groove of the substrate and spaced from the base of the fourth groove of the substrate, a second portion received by the second groove of the fiber block and spaced from the base of the second groove of the fiber block, and a third portion between the first portion and the second portion.

Various embodiments relate to a substrate or interposer including optical passive alignment features for semi-passive alignment.

Various embodiments may relate to a substrate or interposer, a PIC, and/or a fiber block include U or V-grooves. Various embodiments may relate to an assembly with two cylinder rods/pins (e.g. micro machined or dummy fibers) placed on grooves of the substrate or interposer, the PIC, and/or the fiber block. The precision of the grooves and the cylinder rods/pins may align the Z-axis, X-axis, tilt, roll and yaw of the PIC and the fiber block.

Y-axis alignment may be carried out to overcome chip size tolerance (PIC and fiber block) by sliding the fiber block (with signal fiber attached) along the cylinder rods. An additional set of grooves, e.g. U-grooves, and rods may be included to lock the Y position if required.

The substrate or interposer may also electrically connect the PIC chip and a chip such as an EIC chip.

Various embodiments may relate to an assembly including a PIC chip and a fiber block. The fiber block may be allowed to slide along the cylinder rods for optimum Y positioning, while the Z and X positions may be locked by the alignment grooves and the cylinder rod. Also, no pitch and yaw alignment process may be required.

Various embodiments may involve use of multiple UN-grooves and rods e.g. dummy fibers (micro machined pins) to achieve the precision optical alignment and may allow fine tuning along the Y-axis.

Rods may be used to provide a standoff height along the Z-axis for the fiber block and the PIC. The created standoff height may provide clearance for the signal fiber and the micro bumps (electrical connections).

Various embodiments may leverage on the submicron accuracy of lithography and the fiber cladding diameter. The circular cylinder surfaces of rods such as dummy fibers may complement the width of U- or V-grooves to provide precision position control. The absolute height of the standoff may not be critical.

Various embodiments may relate to fiber to chip coupling or chip to chip coupling, fiber array, or fiber-to-chip optical communication circuits.

Various embodiments may improve the alignment process and time—semi passive.

Various embodiments may be integrated on a substrate or silicon (Si) interposer with electrical circuit.

Various embodiments may use the cylindrical rods to set the height from the base substrate. Various embodiments may require fabrication of V-grooves (or U-grooves) instead of the three dimensional (3D) protrusion features.

An additional process of assembling the cylindrical rods may be required.

A through hole may be formed or etched on a silicon interposer at the coupling area under the PIC and the fiber block for visual guide during alignment. Alignment marks for the PIC waveguide position may also be transferred to the surface of the substrate or interposer as visual guides.

Various embodiments may reduce optical alignment processing time. Various embodiments may be integrated in the Si interposer with electrical interconnects. Various embodiments may use multiple U or V-grooves and cylinder rods/pins to achieve the precision optical alignment and may allow fine tuning along the Y-axis. The diameter of the cylinder rods/pins may be used to determine the required offset height of the fiber chip and the PIC The diameter of the cylinder rods/pins may be used to determine the required offset height of the fiber chip and the PIC.

Various embodiments may use a base substrate or silicon interposer with V or U-grooves formed using the same process, to align two or more separate parts in all 5/6 axes.

Various embodiments may include a substrate or interposer for electrical connections, e.g. through metal lines and vias.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An optical assembly comprising:
a substrate comprising:
a first U-shaped groove on a surface of the substrate, the first U-shaped groove having a first lateral surface, a second lateral surface, and a base joining the first lateral surface and the second lateral surface; and
a second U-shaped groove on the surface of the substrate and parallel to the first U-shaped groove of the substrate, the second U-shaped groove having a first lateral surface, a second lateral surface, and a base joining the first lateral surface and the second lateral surface;
a photonic integrated circuit chip above the substrate with a surface of the photonic integrated circuit chip facing the surface of the substrate, the photonic integrated circuit chip comprising:
a coupling waveguide;
a first U-shaped groove on the surface of the photonic integrated circuit chip, the first U-shaped groove having a first lateral surface, a second lateral surface, and a base joining the first lateral surface and the second lateral surface; and a second U-shaped groove on the surface of the photonic integrated circuit chip and parallel to the first U-shaped groove of the photonic integrated circuit chip, the second U-shaped groove having a first lateral surface, a second lateral surface, and a base joining the first lateral surface and the second lateral surface;

an optical fiber above the substrate and lateral to the photonic integrated circuit chip;

a first cylindrical rod having a first portion received by the first U-shaped groove of the substrate, a second portion received by the first U-shaped groove of the photonic integrated circuit chip, and a third portion between the first portion and the second portion; and a second cylindrical rod having a first portion received by the second U-shaped groove of the substrate, a second portion received by the second U-shaped groove of the photonic integrated circuit chip, and a third portion between the first portion and the second portion;

wherein the first cylindrical rod is held by a corner formed by the first lateral surface of the first U-shaped groove of the substrate and the surface of the substrate, and a corner formed by the second lateral surface of the first U-shaped groove of the substrate and the surface of the substrate, so that the first portion of the first cylindrical rod is spaced from the base of the first U-shaped groove of the substrate;

wherein the first cylindrical rod is held by a corner formed by the first lateral surface of the first U-shaped groove of the photonic integrated circuit chip and the surface of the photonic integrated circuit chip, and a corner formed by the second lateral surface of the first U-shaped groove of the photonic integrated circuit chip and the surface of the photonic integrated circuit chip, so that the second portion of the first cylindrical rod is spaced from the base of the first U-shaped groove of the photonic integrated circuit chip;

wherein the second cylindrical rod is held by a corner formed by the first lateral surface of the second U-shaped groove of the substrate and the surface of the substrate, and a corner formed by the second lateral surface of the second U-shaped groove of the substrate and the surface of the substrate, so that the first portion of the second cylindrical rod is spaced from the base of the second U-shaped groove of the substrate;

wherein the second cylindrical rod is held by a corner formed by the first lateral surface of the second U-shaped groove of the photonic integrated circuit chip and the surface of the photonic integrated chip, and a corner formed by the second lateral surface of the second U-shaped groove of the photonic integrated circuit chip and the surface of the photonic integrated chip, so that the second portion of the second cylindrical rod is spaced from the base of the second U-shaped groove of the photonic integrated circuit chip; and wherein the third portion of the first cylindrical rod and the third portion of the second cylindrical rod define a desired vertical offset between the photonic integrated circuit chip and the substrate to align the coupling waveguide with the optical fiber.

2. The optical assembly according to claim 1, wherein the coupling waveguide is aligned with the optical fiber so that light is coupled in a direction parallel to the surface of the substrate between the coupling waveguide and the optical fiber.

3. The optical assembly according to claim 1, wherein the coupling waveguide is aligned with the optical fiber so that light is coupled in a direction out of plane to the surface of the substrate between the coupling waveguide and the optical fiber.

4. The optical assembly according to claim 3, wherein the photonic integrated circuit chip comprises a grating coupler optically coupled to the coupling waveguide; and where the substrate comprises a grating coupler optically coupled to the optical fiber.

5. The optical assembly according to claim 3, further comprising:
one or more further optical fibers above the substrate and lateral to the photonic integrated circuit chip;
where the substrate comprises one or more further grating couplers, each of the one or more grating couplers optically coupled to a respective further optical fiber of the one or more further optical fibers.

6. The optical assembly according to claim 1, further comprising:
a fiber block above the substrate and lateral to the photonic integrated circuit chip;
wherein the optical fiber is coupled to the fiber block; and
wherein the optical assembly further comprises one or more further optical fibers coupled to the fiber block, so that the optical fiber and the one or more optical fibers form a fiber array.

7. The optical assembly according to claim 6, wherein the fiber block comprising:
a first groove, the first groove having a first lateral surface, a second lateral surface, and a base joining the first lateral surface and the second lateral surface; and
a second groove parallel to the first groove, the second groove having a first lateral surface, a second lateral surface, and a base joining the first lateral surface and the second lateral surface.

8. The optical assembly according to claim 7, wherein the first cylindrical rod is also received by the first groove of the fiber block and spaced from the base of the first groove of the fiber block; and wherein the second cylindrical rod is also received by the second groove of the fiber block and spaced from the base of the second groove of the fiber block.

9. The optical assembly according to claim 7, wherein the substrate further comprises:
a third groove on the surface of the substrate, the third groove having a first lateral surface, a second lateral surface, and a base joining the first lateral surface and the second lateral surface; and
a fourth groove on the surface of the substrate and parallel to the third groove of the substrate, the fourth groove having a first lateral surface, a second lateral surface, and a base joining the first lateral surface and the second lateral surface.

10. The optical assembly according to claim 9, further comprising:
a third cylindrical rod having a first portion received by the third groove of the substrate and spaced from the base of the third groove of the substrate, a second portion received by the first groove of the fiber block and spaced from the base of the first groove of the fiber block, and a third portion between the first portion and the second portion; and
a fourth cylindrical rod having a first portion received by the fourth groove of the substrate and spaced from the base of the fourth groove of the substrate, a second portion received by the second groove of the fiber block and spaced from the base of the second groove of the fiber block, and a third portion between the first portion and the second portion.

11. The optical assembly according to claim 6, wherein the substrate comprises a through hole directly below the optical fiber.

12. The optical assembly according to claim 11, wherein the through hole comprises matching gel.

13. The optical assembly according to claim 1, wherein the first U-shaped groove of the substrate comprises epoxy to hold the first cylindrical rod; and wherein the second U-shaped groove of the substrate comprises epoxy to hold the second cylindrical rod.

14. The optical assembly according to claim 1, wherein the photonic integrated circuit chip comprises one or more electrical interconnects.

15. The optical assembly according to claim 14, wherein the substrate comprises one or more electrical interconnects; and wherein the optical assembly comprises one or more electrical connections connecting the one or more electrical interconnects of the substrate and the one or more electrical interconnects of the photonic integrated circuit chip.

16. A method of forming an optical assembly, the method comprising:
providing a substrate comprising:
a first U-shaped groove on a surface of the substrate, the first U-shaped groove having a first lateral surface, a second lateral surface, and a base joining the first lateral surface and the second lateral surface; and
a second U-shaped groove on the surface of the substrate and parallel to the first groove of the substrate, the second U-shaped groove having a first lateral surface, a second lateral surface, and a base joining the first lateral surface and the second lateral surface;
arranging a photonic integrated circuit chip above the substrate with a surface of the photonic integrated circuit chip facing the surface of the substrate, the photonic integrated circuit chip comprising:
a coupling waveguide;
a first U-shaped groove on the surface of the photonic integrated circuit chip, the first U-shaped groove having a first lateral surface, a second lateral surface, and a base joining the first lateral surface and the second lateral surface; and
a second U-shaped groove on the surface of the photonic integrated circuit chip and parallel to the first U-shaped groove of the photonic integrated circuit chip, the second U-shaped groove having a first lateral surface, a second lateral surface, and a base joining the first lateral surface and the second lateral surface;
arranging an optical fiber above the substrate and lateral to the photonic integrated circuit chip;
arranging a first cylindrical rod so that the first cylindrical rod has a first portion received by the first U-shaped groove of the substrate, a second portion received by the first U-shaped groove of the photonic integrated circuit chip, and a third portion between the first portion and the second portion; and arranging a second cylindrical rod so that the second cylindrical rod has a first portion received by the second U-shaped groove of the substrate, a second portion received by the second U-shaped groove of the photonic integrated circuit chip, and a third portion between the first portion and the second portion;

wherein the first cylindrical rod is held by a corner formed by the first lateral surface of the first U-shaped groove of the substrate and the surface of the substrate, and a corner formed by the second lateral surface of the first U-shaped groove of the substrate and the surface of the substrate, so that the first portion of the first cylindrical rod is spaced from the base of the first U-shaped groove of the substrate;

wherein the first cylindrical rod is held by a corner formed by the first lateral surface of the first U-shaped groove of the photonic integrated circuit chip and the surface of the photonic integrated circuit chip, and a corner formed by the second lateral surface of the first U-shaped groove of the photonic integrated circuit chip and the surface of the photonic integrated circuit chip, so that the second portion of the first cylindrical rod is spaced from the base of the first U-shaped groove of the photonic integrated circuit chip;

wherein the second cylindrical rod is held by a corner formed by the first lateral surface of the second U-shaped groove of the substrate and the surface of the substrate, and a corner formed by the second lateral surface of the second U-shaped groove of the substrate and the surface of the substrate, so that the first portion of the second cylindrical rod is spaced from the base of the second U-shaped groove of the substrate;

wherein the second cylindrical rod is held by a corner formed by the first lateral surface of the second U-shaped groove of the photonic integrated circuit chip and the surface of the photonic integrated chip, and a corner formed by the second lateral surface of the second U-shaped groove of the photonic integrated circuit chip and the surface of the photonic integrated chip, so that the second portion of the second cylindrical rod is spaced from the base of the second U-shaped groove of the photonic integrated circuit chip; and wherein the third portion of the first cylindrical rod and the third portion of the second cylindrical rod define a desired vertical offset between the photonic integrated circuit chip and the substrate to align the coupling waveguide with the optical fiber.

* * * * *